US006581708B2

(12) United States Patent
Lawrence et al.

(10) Patent No.: US 6,581,708 B2
(45) Date of Patent: Jun. 24, 2003

(54) QUICK MOUNT VEHICLE ENGINE COMPARTMENT SPLASH PANEL

(75) Inventors: Chad A. Lawrence, VanWert, OH (US); Patrick O. Gotschall, Fort Wayne, IN (US); Carl W. Fuhrman, Indianapolis, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/971,826

(22) Filed: Oct. 5, 2001

(65) Prior Publication Data

US 2003/0066698 A1 Apr. 10, 2003

(51) Int. Cl.$^7$ ............................................. B62D 27/06
(52) U.S. Cl. ...................... 180/69.1; 280/154; 296/198
(58) Field of Search ................................ 280/154, 159, 280/847, 848, 849, 854, 768; 296/198; 180/69.1

(56) References Cited

U.S. PATENT DOCUMENTS

| | | | | |
|---|---|---|---|---|
| 1,396,351 A | * | 11/1921 | Behn | 280/154 |
| 2,582,839 A | * | 1/1952 | Lippard et al. | 280/847 |
| 2,611,628 A | * | 9/1952 | Schatzman | 280/848 |
| 2,761,523 A | * | 9/1956 | Lee | 180/69.2 |
| 2,769,503 A | * | 11/1956 | Wagner | 180/89.17 |
| 4,121,684 A | * | 10/1978 | Stephens et al. | 180/89.14 |
| 4,724,585 A | * | 2/1988 | Whitman | 24/195 |
| 5,108,129 A | * | 4/1992 | Olsen | 280/850 |
| 5,139,285 A | | 8/1992 | Lasinski | |
| 5,787,550 A | | 8/1998 | Bender | |
| 6,334,645 B1 | * | 1/2002 | Ban | 296/198 |

* cited by examiner

Primary Examiner—Brian L. Johnson
Assistant Examiner—Brian L. Swenson
(74) Attorney, Agent, or Firm—Jeffrey P. Calfa; Neil T. Powell; Dennis Kelly Sullivan

(57) ABSTRACT

An engine compartment splash panel for a vehicle is disposed generally between the engine of the vehicle and a nearby wheel to prevent water and debris from being flung from the nearby wheel onto the engine. The engine compartment splash panel and the panel-support components that mount it to the vehicle are constructed in such a manner that the engine compartment splash panel can be quickly and easily mounted to and removed from the vehicle to provide for expedient execution of service procedures. The engine compartment splash panel has a substantially rigid portion that defines and/or has mounted to it a number of locating features that have fixed positions relative to one another. The panel-support components define and/or have mounted to them a plurality of locating features that have fixed positions relative to one another and that are complimentary to the locating features of the engine compartment splash panel. When mounting the engine compartment splash panel, an individual can manipulate the engine compartment splash panel to simultaneously align a plurality of the locating features of the engine compartment splash panel to their complimentary locating features of the panel-support components.

46 Claims, 18 Drawing Sheets

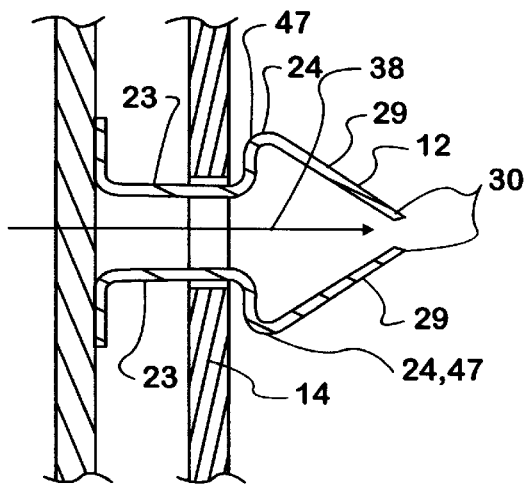
FIG. 4a
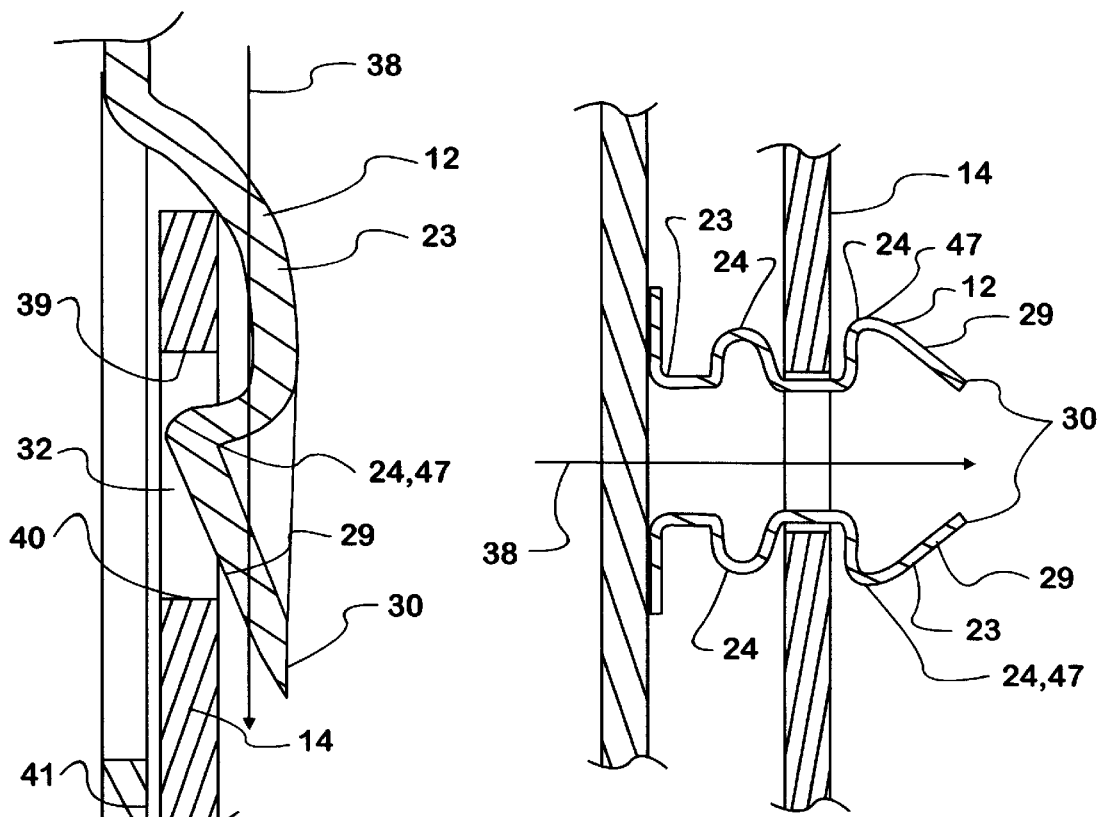
FIG. 4b
FIG. 4c

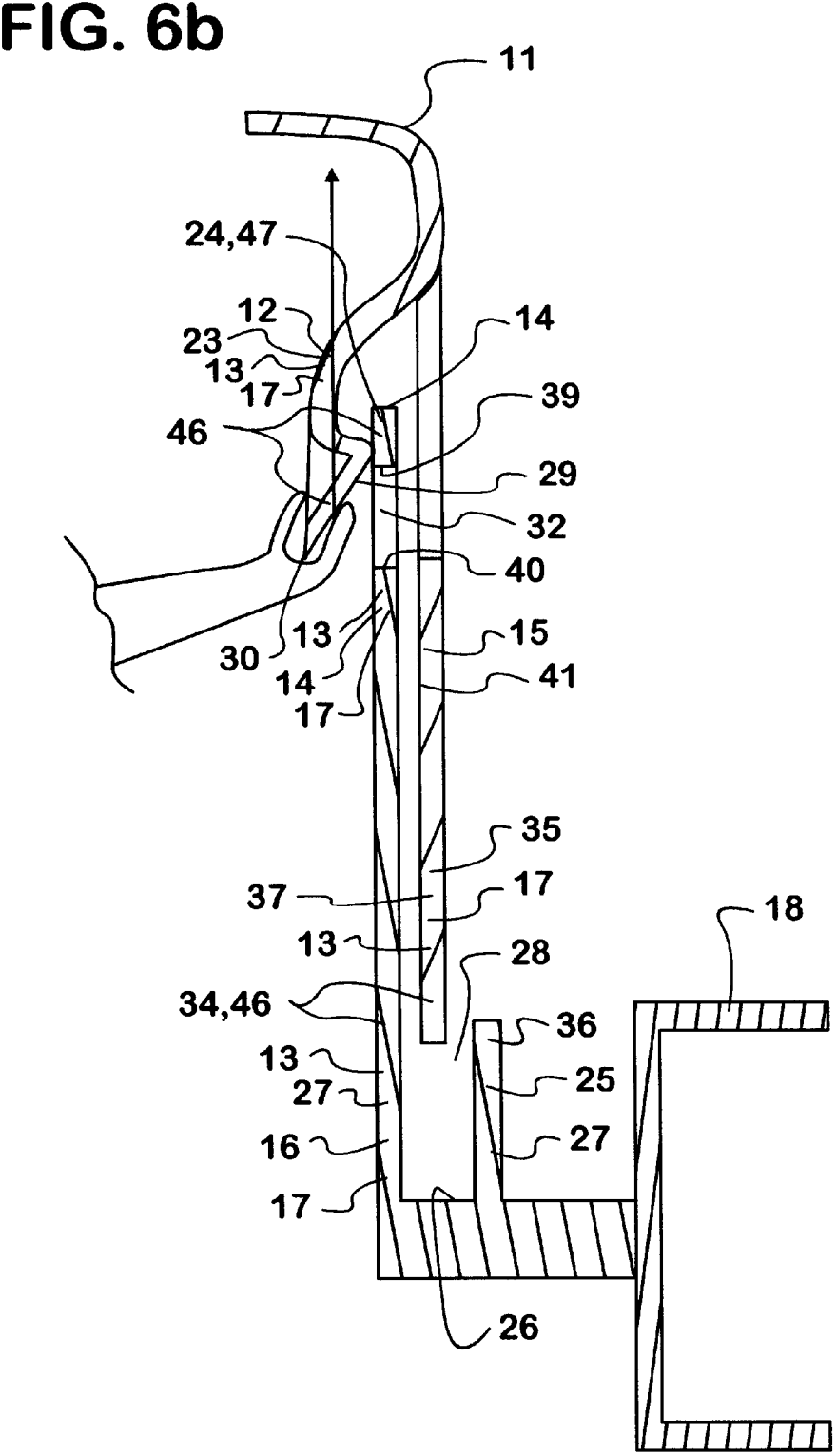

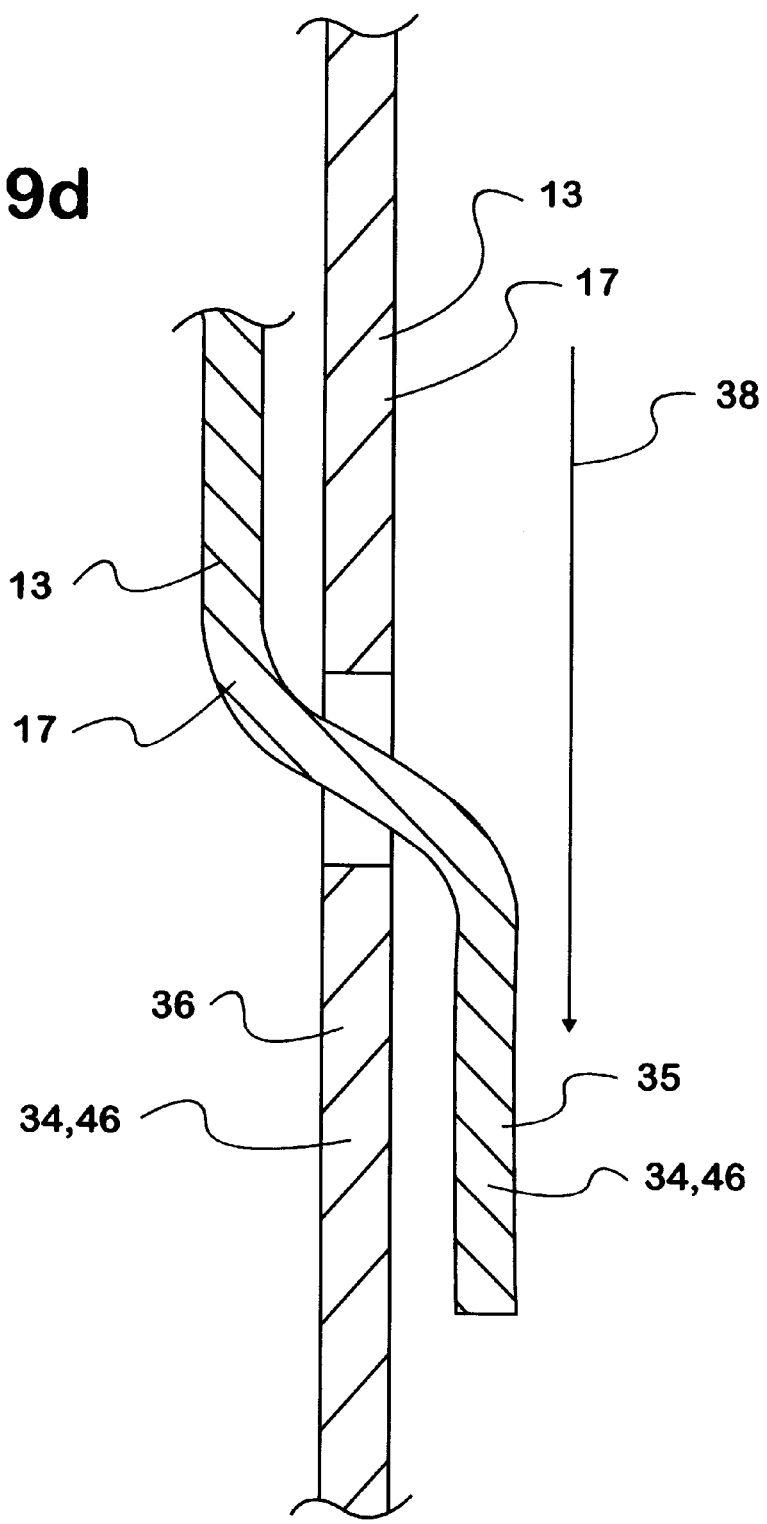

QUICK MOUNT VEHICLE ENGINE COMPARTMENT SPLASH PANEL

BACKGROUND OF THE INVENTION

This invention relates to vehicle body panels and the means by which they are engaged to vehicles. As is generally well known, many vehicles have engine compartment splash panels that may be rigidly mounted to the vehicle in an in-service position between an engine of the vehicle and a nearby wheel of the vehicle. Debris and/or water that is flung toward the engine by the wheel that is nearby the engine is deflected by such an engine compartment splash panel and is, thus, prevented from entering the area immediately surrounding the engine. In order that a person may access the area surrounding the engine from the area surrounding the nearby wheel while performing maintenance, such engine compartment splash panels and the vehicles that they are mounted to are generally constructed in such a manner that the engine compartment splash panel can be moved from its in-service position.

The more quickly and easily such an engine compartment splash panel can be separated from and subsequently remounted to the vehicle in its in-service position, the more quickly vehicle maintenance procedures may be accomplished. Many engine compartment splash panels are mounted to vehicles in an in-service position using fasteners which make it necessary to use tools to mount the engine compartment splash panel to the vehicle or to separate it from the vehicle. Other known constructions of vehicles include clips that serve to partially or fully secure such engine compartment splash panels in their in-service position. In general, the use of clips to secure such engine compartment splash panels to a vehicle enables quicker and easier mounting and dismounting of the engine compartment splash panel as compared to the use of other types of fasteners. Known constructions of vehicles that include clips for retention of such engine compartment splash panels to the vehicle in their in-service position require that an individual successively grasp and manipulate individual clips in order to mount or dismount the engine compartment splash panel. The manipulation of each individual clip in order to execute these processes is often time consuming and difficult.

SUMMARY OF INVENTION

As a result,—an object of the present invention is to provide a vehicle and an engine compartment splash panel that are constructed in such a manner that the engine compartment splash panel may be mounted to and subsequently dismounted from the vehicle in a quick and easy manner as compared to known constructions.

The vehicle of the present invention includes an engine compartment splash panel that may be rigidly mounted to panel-support components of the vehicle in an in-service position in which it is disposed between an engine of the vehicle and a nearby wheel. The construction of the engine compartment splash panel and the vehicle of the present invention is such that the engine compartment splash panel may be moved from its in-service position to enable an individual to access the area surrounding the engine from the area surrounding the nearby wheel. The engine compartment splash panel and the panel-support components of the vehicle include panel-mounting structure. When all of the locating features of the engine compartment splash panel are properly engaged to corresponding locating features of the panel-support components they serve to maintain the mounting of the engine compartment splash panel to the vehicle in its in service position. The locating features of the panel-mounting structure may include any of a number of different types of components including fasteners, clips, tabs, recesses, channels etc. that can be engaged to one another and the engine compartment splash panel and panel-support components in such a manner to maintain the engine compartment splash panel in its in-service position. A large portion of the engine compartment splash panel of the present invention has a substantially rigid construction and the majority of the locating features of the engine compartment splash panel are mounted to or defined by this substantially rigid portion of the engine compartment splash panel. Those locating features that are mounted to or defined by the substantially rigid portion of the engine compartment splash panel, thus, have substantially fixed positions and orientations relative to one another. Additionally, the locating features of the panel-support components that are complimentary to the locating features that are mounted to or defined by the substantially rigid portion of the engine compartment splash panel, have substantially fixed positions and orientations relative to one another. Such a construction of the engine compartment splash panel and the panel-mounting structure facilitates relatively expedient mounting of the engine compartment splash panel to the vehicle in its in-service orientation. During mounting of such an engine compartment splash panel to a vehicle with such a construction of panel-support components, all complimentary locating features of such a construction of panel-mounting structure may be simultaneously aligned to one another. Thus, it can be seen that the above-mentioned object of the present invention as well as other objects not mentioned have been met.

DRAWINGS

Other objects and advantages of the invention will become more apparent upon perusal of the detailed description thereof and upon inspection of the drawings in which:

FIG. 4a is a view, partially in section, of a spring clip that is self-camming in engagement but not self-camming in disengagement, and that comprises two leaf springs, each of which defines only one retention projection and also showing a clip engagement structure engaged to the spring clip.

FIG. 4b is a view, partially in section, of a spring clip that is self-camming in engagement but not self-camming in disengagement, and that comprises one leaf spring and also showing a clip engagement structure engaged to the spring clip.

FIG. 4c is a view, partially in section, of a spring clip that is self-camming in engagement but not self-camming in disengagement, and that comprises two leaf springs, each of which defines two retention projections and also showing a clip engagement structure engaged to the spring clip.

FIG. 6b is a sectional view showing an intermediate stage in a process of dismounting an engine compartment splash panel from panel-support components.

FIG. 9d shows a complimentary pair of slide-to-engage panel-locating features, that are constructed in such a manner that they must be shifted and or rotated relative to one another and relative to their engagement direction during the process of engagement to one another.

DETAILS OF INVENTION

Figure 1:
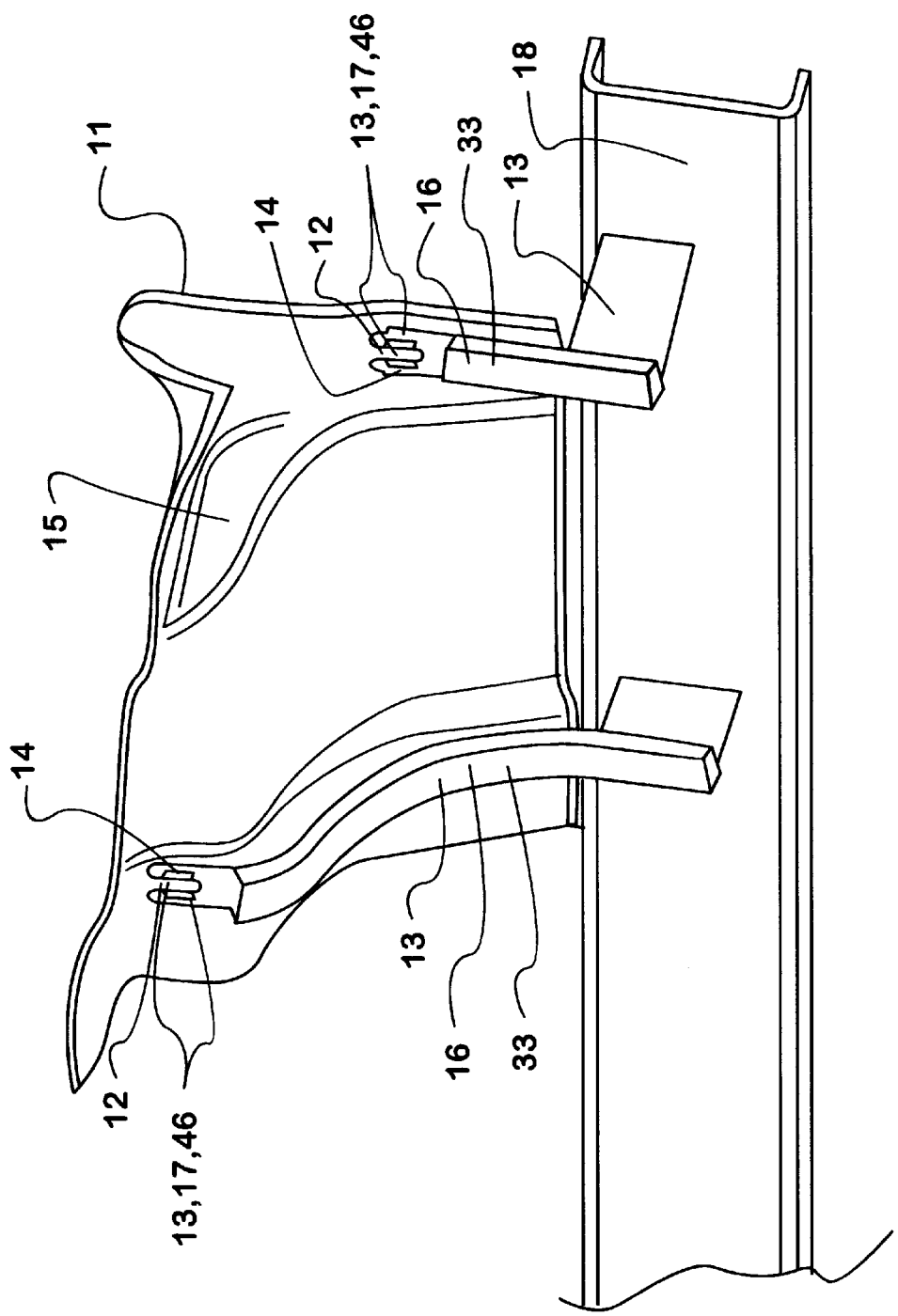
FIG. 1 is a perspective view from a first angle showing an engine compartment splash panel according to the present invention mounted to panel-support components and showing a portion of frame structure to which the panel-support components are mounted.
Figure 2:
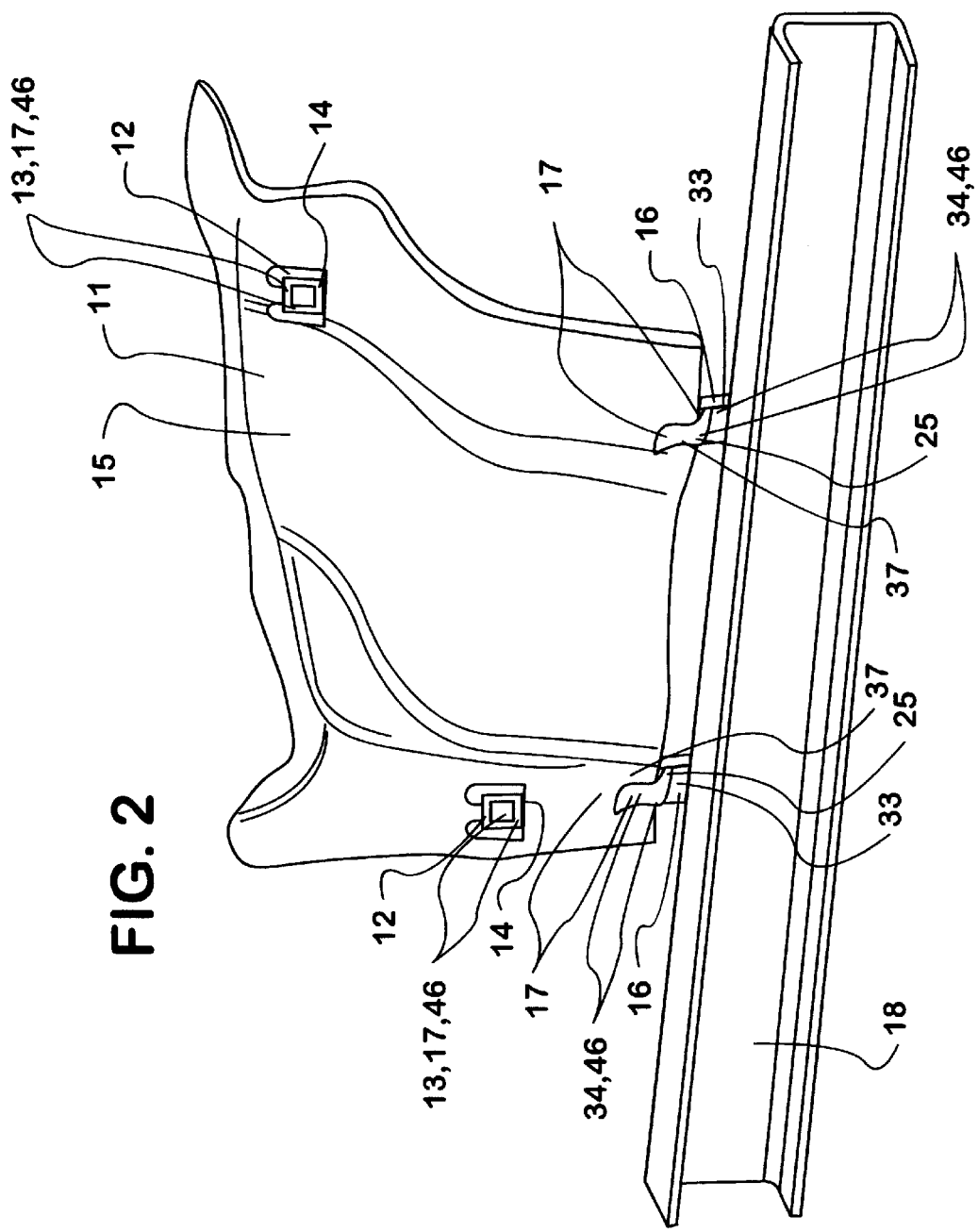
FIG. 2 is a perspective view from a second angle showing an engine compartment splash panel according to the present invention mounted to panel-support components and showing a portion of frame structure to which the panel-support components are mounted.

Turning now to the figures the present invention will be described in detail hereinafter. Most of the systems and components of a vehicle 10 according to the present invention may be constructed in substantially any manner well known to or easily imaginable by one of ordinary skill in the art. A vehicle 10 according to the present invention comprises one or more frame structures 18 that are relatively strong constructions to which a large percentage of other components of the vehicle 10 are directly or indirectly engaged and from which a large percentage of other components of the vehicle 10 derive support directly or indirectly. A vehicle 10 according to the present invention further comprises a suspension system 19 to which the one or more frame structures 18 of the vehicle 10 are engaged. The suspension system 19 supports the one or more frame structures 18 above the ground. In addition to providing support for the one or more frame structures 18 of the vehicle 10 the suspension system 19 provides the vehicle 10 with a relatively low resistance to movement along the ground. A vehicle 10 according to the present invention would most likely also include an operator cabin 22 of any of a number of well known or easily imaginable constructions, engaged to and supported by one or more of the one or more frame structures 18 of the vehicle 10. A vehicle 10 according to the present invention also includes an engine 20 that is provided for motivating the vehicle 10 along the ground. The engine 20 of a vehicle 10 according to the present invention would most likely be directly mounted to one or more of the one or more frame structures 18 of the vehicle 10. The suspension system 19 of a vehicle 10 according to the present invention includes one or more wheels 21 that are disposed near the engine 20 of the vehicle 10. Each of the one or more wheels 21 that are disposed near the engine 20 may be in direct contact with the ground or, alternatively, may be any of different types of wheels 21 of a track-laying suspension system, various types of constructions of which are well known. The wheels 21 that are disposed near the engine 20 tend to fling in various directions debris and/or water as the vehicle 10 travels along the ground. In certain circumstances the one or more wheels 21 that are disposed near the engine 20 will fling debris and/or water toward the engine 20. Debris and/or water flung from the wheels 21 of the vehicle 10 onto the engine 20 or other surrounding components of the vehicle 10 can adversely affect the performance of the vehicle 10. The vehicle 10 of the present invention has an engine compartment splash panel 15 that may be rigidly mounted in an in-service position between the engine 20 and one or more wheels 21 that are located near the engine 20. When the engine compartment splash panel 15 is rigidly mounted in this in-service position it prevents at least some of the debris and/or water, that is flung by one or more wheels 21 near the engine 20, from impacting the engine 20 and other nearby components of the vehicle 10.

The vehicle 10 of the present invention is constructed to allow the engine compartment splash panel 15 to be easily moved from its in-service position to facilitate maintenance of the engine 20 and other nearby components of the vehicle 10. The area adjacent the one or more wheels 21 that are near the engine 20 is a relatively convenient place from which to access the area directly adjacent the engine 20 and to perform maintenance of the engine 20 and other components directly adjacent the engine 20. When the engine compartment splash panel 15 of the vehicle 10 of the present invention is mounted in its in-service position it is difficult, however, to access the area directly adjacent the engine 20 from the area directly adjacent the one or more wheels 21 that are near the engine 20. The construction of a vehicle 10 and the engine compartment splash panel 15 of the present invention may be such that the engine compartment splash panel 15 can be quickly and easily separated from the vehicle 10 and set aside to allow access to the area directly adjacent the engine 20. Alternatively, the construction of a vehicle 10 according to the present invention may be such that the engine compartment splash panel 15 may be quickly and easily moved from its in-service position to a position in which access to the area directly adjacent the engine 20 is allowed while the engine compartment splash panel 15 remains attached to the vehicle 10.

A vehicle 10 according to the present invention includes panel-support components 16 to which the engine compartment splash panel 15 is mounted when it is in its in-service position. The panel-support components 16 are, in turn, engaged directly or indirectly to one or more of the one or more frame structures 18 of the vehicle 10. It will be understand that a panel-support component 16 that is indirectly mounted to a frame structure 18 of the vehicle 10 is mounted to one or more intermediate components. Examples of such intermediate components to which a panel-support component may be mounted include but would not be limited to, one or more components of the operator cabin 22, one or more components of the suspension system 19, and/or one or more component of other body components such as an engine compartment hood 34. The intermediate components to which a panel-support component 16 may be mounted, would, in turn, be mounted to a frame structure 18 of the vehicle 10. The engine compartment splash panel 15 and the panel-support components 16 of the vehicle 10 of the present invention comprise panel-mounting structure 13. When all of the panel-mounting structure 13 of the engine compartment splash panel 15 is properly engaged to all of the corresponding panel-mounting structure 13 of the panel-support components 16, the engine compartment splash panel 15 is rigidly maintained in its in-service position. The panel-mounting structure 13 comprises locating features 17 that interact with each other in order to maintain proper location of the engine compartment splash panel 15 when it is in its in-service position. The locating features 17 of the panel-mounting structure 13 may include such things as fasteners, clips, tabs, and recesses, that may be engaged to one another and the engine compartment splash panel 15 and panel-support components 16 in such a manner that the engine compartment splash panel 15 is substantially rigidly mounted in its in-service position to the vehicle 10.

The locating features 17 of the panel-mounting structure 13 include one or more complimentary pairs of panel-locating features 46, which preferably but not necessarily, include one or more complimentary pairs of slide-to-engage panel-locating features 34. Each complimentary pair of slide-to-engage panel locating features 34 of the panel-mounting structure 13 includes a male panel-locating feature 35 and a female panel-locating feature 36. Each of FIGS. 9a, 9b, 9c, and 9d illustrates one possible embodiment of a male panel-locating feature 35 and a female panel-locating feature 36 of a complimentary pair of slide-to-engage panel-locating features 34 that are properly engaged to one another. The male panel-locating feature 35 of each complimentary pair of slide-to-engage panel-locating features 34 is mounted to or defined by either the engine compartment splash panel 15 or the panel-support components 16. A male panel-locating feature 35 of such a complimentary pair of slide-to-engage panel-locating features 34 includes a projection of some sort such as any of number of different shapes of tabs, flanges, or pins. The female panel-locating feature 36 of each complimentary pair of slide-to-engage locating features 34 is mounted to or defined by whichever of the engine compartment splash panel 15 and the panel-support components 16 its complimentary male panel-locating feature 35 is not mounted to or defined by. Such a female panel-locating feature 36 has structure that defines a recess within which a projection of the male panel-locating structure 35 may be disposed when the complimentary pair of slide-to-engage panel-locating features 34 are properly engaged to one another. It will be understood that a complimentary pair of slide-to-engage panel-locating features 34 of the panel-mounting structure 13 may include two panel-locating features 17 each of which acts as both a male panel-locating feature 35 and a female panel-locating feature 36 as is the case with the complimentary pair of slide-to-engage panel-locating features 34 shown in FIG. 9c. It will also be understood that many constructions and engagements of a complimentary pair of slide-to-engage panel-locating features 34 other than those shown in the figures are well known or easily imaginable by one of ordinary skill in the art and may be utilized in the panel-mounting structure 13 of the present invention.

When properly engaged to a complimentary female panel-locating feature 36, the male panel-locating feature 35 of a complimentary pair of slide-to-engage panel-locating features 34 is bounded in one or two directions between the structure of the female panel-locating feature 36 that defines the recess. Thus, a complimentary pair of slide-to-engage panel-locating features 34 that are properly engaged to one another in such a manner are prevented from translating relative to one another in the directions in which the male panel-locating feature 35 is bounded by the structure of the female panel-locating feature 36. The male and female panel-locating features 17 of a complimentary pair of slide-to-engage panel-locating features 34 that are properly engaged to one another in such a manner are, however, free to slide relative to one another in at least one direction perpendicular to the one or more directions in which the structure of the female panel-locating structure 36 bounds the male panel-locating structure 35. The male panel-locating feature 35 and the female panel-locating feature 36 of a complimentary pair of slide-to-engage panel-locating features 34 may be engaged to one another by sliding them together in one or more of the directions in which they are free to slide relative to one another when they are properly engaged to one another. Each direction in which the male panel-locating feature 35 and the female panel-locating feature 36 may be slid together is considered to be an engagement direction 38 of the complimentary pair of slide-to-engage panel-locating features 34. A complimentary pair of slide-to-engage panel-locating features 34 may have only one engagement direction 38 or it may have many engagement directions 38. A complimentary pair of slide-to-engage panel-locating features 34 comprising a male panel-locating feature 35 that comprises a cylindrical pin and a female panel-locating feature 36 that defines a cylindrical recess for reception of the pin, would, for example have only one possible engagement direction 38 parallel to an axis of the pin. Alternatively a complimentary pair of slide-to-engage panel-locating features 34 comprising a male panel-locating feature 35 that comprises a planar tab and a female panel-locating feature 36 that defines, for reception of the planar tab, a slot of substantially constant cross section and with open ends, would, have many possible engagement directions 38 parallel to the plane of the tab of the male panel-locating feature 35. It will also be understood that, while generally not preferable, a complimentary pair of slide-to-engage panel-locating features 34 may be constructed in such a manner that the male panel-locating feature 35 may have to be shifted and/or rotated relative to the engagement direction 38 of the complimentary pair of slide-to-engage panel-locating features 34 during the engagement process. One construction of a complimentary pair of slide-to-engage panel-locating features 34 that requires shifting and rotating of the male panel-locating feature 35 relative to the engagement direction 38 of the complimentary pair of slide-to-engage panel locating features 34 during its engagement to the female panel-locating feature 36 is illustrated in FIG. 9d.

The complimentary pairs of panel-locating features 46 of the panel-mounting structure 13, also preferably but not necessarily, include one or more complimentary pairs of a spring clip 12 and a clip engagement structure 14. The spring clip 12 of each complimentary pair of a spring clip 12 and a clip engagement structure 14 is mounted to or defined by either the engine compartment splash panel 15 or the panel-support components 16 of the vehicle 10. The clip engagement structure 14 of each complimentary pair of a spring clip 12 and a clip engagement structure 14 is mounted to or defined by whichever of the engine compartment splash panel 15 and the panel-support components 16 the spring clip 12 that is complimentary to it is not mounted to or defined by.

Figure 3A:
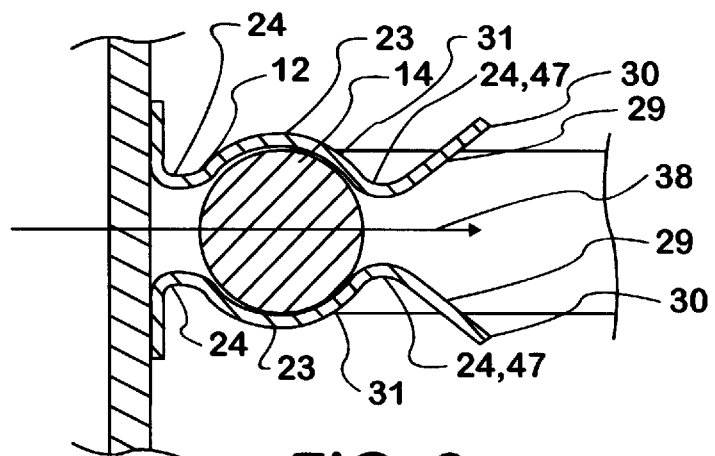
FIG. 3a is a view, partially in section, of a spring clip that comprises two leaf springs and that is self-camming in engagement and also self-camming in disengagement and also showing a clip engagement structure engaged to the spring clip.
Figure 3B:
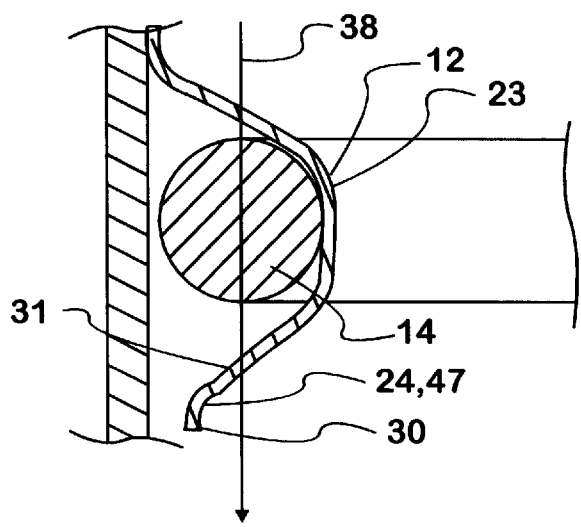
FIG. 3b is a view, partially in section, of a spring clip that comprises one leaf spring and that is self-camming in disengagement but is not self-camming in engagement and also showing a clip engagement structure engaged to the spring clip.
Figure 3C:
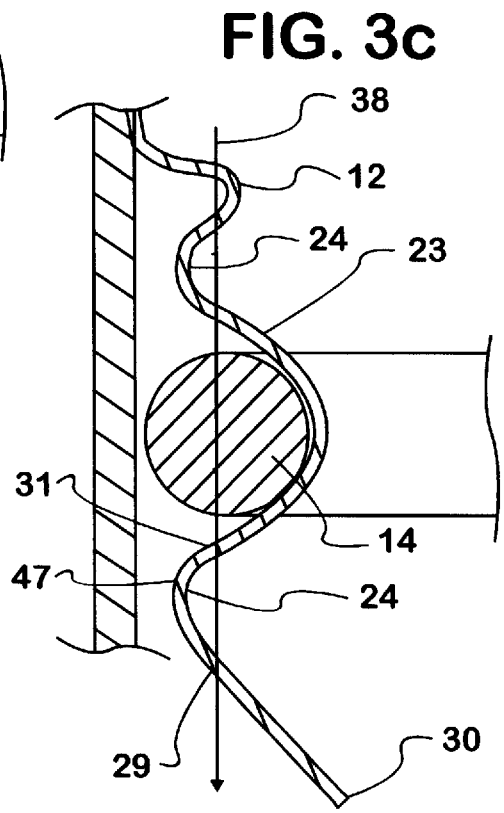
FIG. 3c is a view, partially in section, of a spring clip that comprises one leaf spring and that is self-camming in engagement and also self-camming in disengagement and also showing a clip engagement structure engaged to the spring clip.

Each complimentary pair of a spring clip 12 and a clip engagement structure 14 of the panel-mounting structure 13 of the present invention may have any of a number of well known or easily imaginable designs. FIGS. 3a, 3b, 3c, 4a, 4b, and 4c illustrate different constructions of complimentary pairs of a spring clip 12 and a clip engagement structure 14 that could be utilized in the panel-mounting structure 13 of the present invention. In general, a spring clip 12 of the panel-mounting structure 13 of the present invention comprises one or more leaf springs 23 that may be made of any of a number of different materials and that is/are relatively flexible in bending in at least one direction. A clip engagement structure 14 of the panel-mounting structure 13 of the present invention comprises structure that is to be engaged to the one or more leaf springs 23 of a complimentary spring clip 12. The construction of each complimentary pair of a spring clip 12 and a clip engagement structure 14, the engine compartment splash panel 15, and the panel support components 16 of the present invention may be of any of a number of designs in conformance with the above prescribed guidelines. These components of the panel-mounting structure 13 are constructed in such a manner that, when a respective complimentary pair of a spring clip 12 and a clip engagement structure 14 are properly engaged, substantial relative movement between the spring clip 12 and the clip engagement structure 14 is prevented in at least two directions. These two directions include at least one direction perpendicular to a direction in which at least one of the leaf springs 23 of the spring clip 12 extends toward its outer end 30. Restriction of movement, in at least one direction perpendicular to that in which one of the leaf springs 23 extends, between a spring clip 12 and a clip engagement structure 14 that are engaged to one another may be effected in any of a number of different ways. The construction of the components may be such that the clip engagement structure 14 is bounded between two leaf springs 23 of the spring clip 12 or between a leaf spring 23 of the spring clip 12 and an adjacent portion of the component to which the spring clip 12 is mounted or by which the spring clip 12 is defined. Such constructions of a complimentary pair of a spring clip 12 and clip engagement structure 14 are shown in FIGS. 3a, 3b, and 4b. Alternatively, one or more of the leaf springs 23 of a spring clip 12 may be bounded between opposed portions of the clip engagement structure 14 as is shown in FIGS. 4a and 4c. Additionally, when a complimentary pair of a spring clip 12 and a clip engagement structure 14 are engaged to one another, the spring clip 12 and the clip engagement structure 14 are prevented from moving substantially relative to one another in directions parallel to the general direction of extension of at least one of the leaf springs 23. In order to effect such a restriction of relative movement between a properly engaged spring clip 12 and clip engagement structure 14, one or more of the leaf springs 23 of each spring clip 12 comprise one or more retention projections 24. Each of the retention projection(s) 24 extends from a respective leaf spring 23 that defines it in a direction perpendicular to the direction in which the leaf spring 23 extends toward its outer end 30. The retention projections 24 of a spring clip 12 may interact in any of a number of different ways with structure of the complimentary clip engagement structure 14 in order to promote maintenance of engagement between a spring clip 12 and a clip engagement structure 14. The clip engagement structure 14 may be bounded between one or more retention projections 24 of the spring clip 12 and one or more portions of the component that the spring clip 12 is mounted to or defined by as is shown in FIGS. 3a and 4a. The clip engagement structure 14 may be bounded between a retention projection 24 of the spring clip 12 and a bridge portion 25 of a leaf spring 23 of the spring clip 12 as is shown in FIG. 3b. As is shown in FIG. 3c and 4c the clip engagement structure 14 may be bounded between two spaced retention projections 24 of one or more of the leaf springs 23 of a spring clip 12. Alternatively, one or more retention projections 24 of one or more leaf springs 23 of a spring clip 12 may be bounded between opposed portions of a clip engagement structure 14 as is shown in FIG. 4b. It will be understood that the constructions of spring clips 12 and clip engagement structures 14 shown in the figures are exemplary of only a small sampling of possible constructions that are well known or easily imaginable by one of ordinary skill in the art and that could therefore be utilized in the panel-mounting structure 13 according to the present invention.

In many embodiments of the present invention one or more complimentary pairs of a spring clip 12 and a clip engagement structure 14 is a self-retaining complimentary pair of a spring clip and a clip engagement structure. A self-retaining complimentary pair of a spring clip 12 and a clip engagement structure 14 according to the present invention is one that comprises a leaf spring 23 with one or more retention projections 24 that cooperate with some portion of the clip engagement structure 14 to obstruct inadvertent disengagement of the self-retaining complimentary pair of a spring clip 12 and a clip engagement structure 14. When a self-retaining complimentary pair of a spring clip 12 and a clip engagement structure 14 are engaged to one another, at least one of its one or more of its retention projections 24 and at least one portion of its clip engagement structure 14 cooperate to obstruct inadvertent disengagement as a result of the retention projection 24 and the portion of the clip engagement structure 14 being disposed in one another's path in a disengagement direction of the self-retaining complimentary pair of a spring clip 12 and a clip engagement structure 14. Because the retention projection 24 and the portion of the clip engagement structure 14 are so disposed in one another's path the leaf spring 23 must be deformed outwardly before the retention projection 24 and the portion of clip engagement structure can clear one another and the spring clip 12 and clip engagement structure 14 may be separated from one another. An assembled self-retaining complimentary pair of a spring clip 12 and a clip engagement structure 14 is illustrated in detail in each of FIGS. 3a, 3b, 3c, 4a, 4b, 4c, 7c, and 8d. Of course self-retaining complimentary pairs of a spring clip 12 and a clip engagement structure 14 are illustrated in others of the figures in less detail and/or in an unassembled state.

Figure 5A:
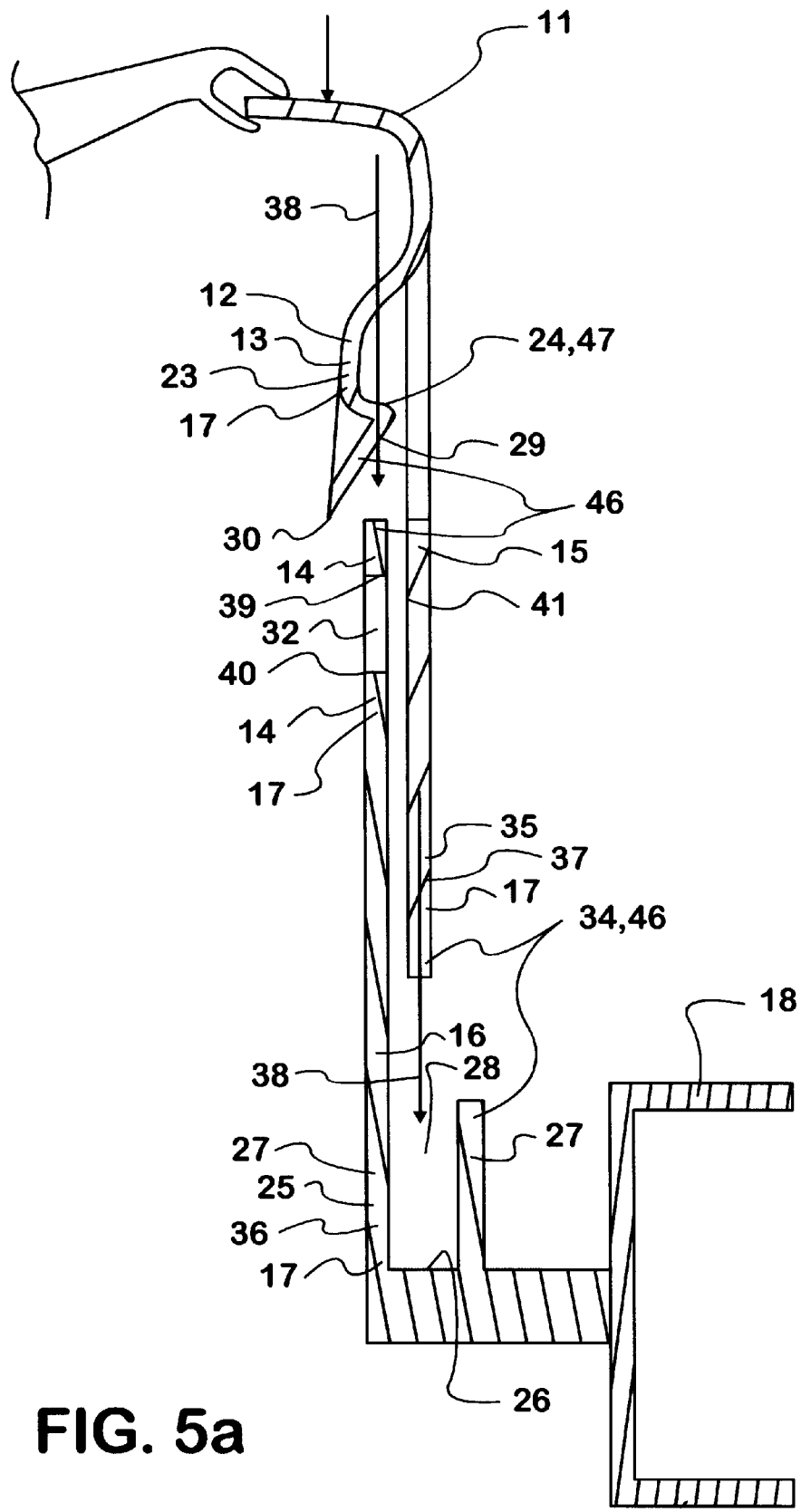
FIG. 5a is a sectional view showing an early stage in a process of mounting an engine compartment splash panel to panel-support components.
Figure 5B:
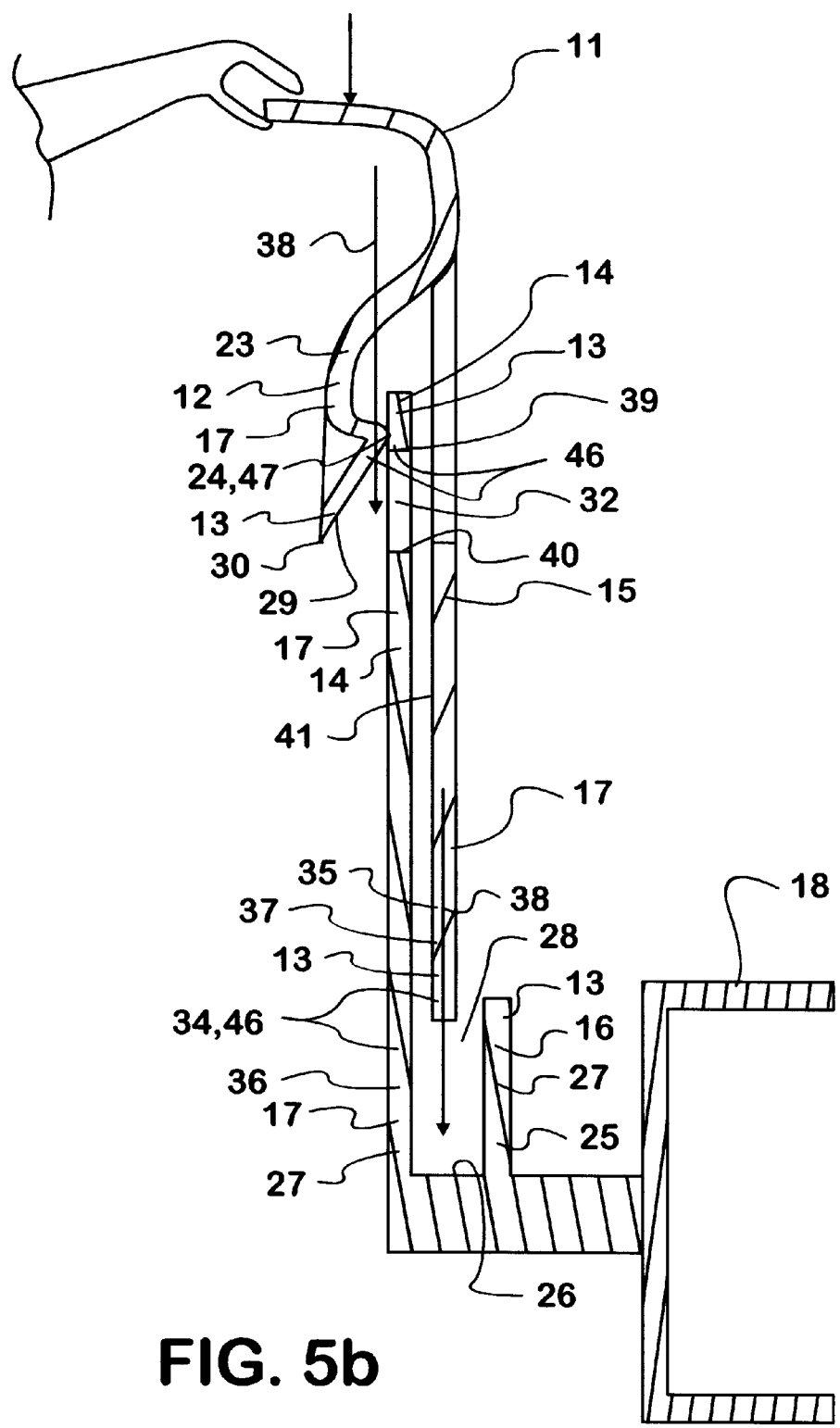
FIG. 5b is a sectional view showing an intermediate stage in a process of mounting an engine compartment splash panel to panel-support components.

In order to disengage from one another a spring clip 12 and a clip engagement structure 14 of the panel-mounting structure 13, one or more of the leaf springs 23 of the spring clip 12 must be elastically deformed. The one or more leaf springs 23 must be elastically deformed in such a direction that the clip engagement structure 14 and the spring clip 12 may be translated relative to one another in directions perpendicular to the direction in which one or more of the retention projections 24 extend, without the retention projections 24 abutting portions of the clip engagement structure 14 that it would abut were the leaf springs 23 not elastically deformed in such a direction. Generally, in order to accomplish this result so that a complimentary pair of a spring clip 12 and a clip engagement structure 14 can be disengaged from one another, one or more of the leaf springs 23 of the spring clip 12 must be elastically deformed in a direction opposite a direction in which a retention projection 24 extends from them. FIG. 6b shows a leaf spring 23 of a spring clip 12, elastically deformed in a direction opposite the direction which the retention projection 24 of the leaf spring 23 projects from the leaf spring 23, as the retention projection 24 is slid past a portion of a clip retention structure 14 from which the spring clip 12 is being disengaged. One or more of the leaf springs 23 of a spring clip 12 of the panel-mounting structure 13 must be elastically deformed in a similar manner in order to allow retention projections 24 of the spring clip 12 to pass portions of a respective clip engagement structure 14 during the process of engaging the spring clip 12 to the clip engagement structure 14. FIG. 5b shows a leaf spring 23 of a spring clip 12, that is elastically deformed in a direction opposite the direction which the retention projection 24 of the leaf spring 23 projects from the leaf spring 23, as the retention projection 24 is slid past a portion of a clip engagement structure 14 to which the spring clip 12 is being engaged.

Similar to a complimentary pair of slide-to-engage pane-locating features 34 a complimentary pair of a spring clip 12 and a clip engagement structure 14 have one or more engagement directions 38. An engagement direction 38 of a complimentary pair of a spring clip 12 and a clip engagement structure 14 is a direction in which the spring clip 12 and the clip engagement structure 14 may be moved relative to one another in order to property engage them to one another. Generally, each of the one or more engagement directions 38 of a complimentary pair of a spring clip 12 and a clip engagement structure 14 is parallel to the direction in which one or more of the leaf springs 23 of the spring clip 12 extend toward their outer end 30.

The engine compartment splash panel 15 and the panel-support components 16 of the vehicle 10 are constructed in such a manner to facilitate rapid alignment of the locating features 17 of the engine compartment splash panel 15 to the locating features 17 of the panel-support components 16. A majority of the engine compartment splash panel 15 of the present invention is of a substantially rigid construction. The substantially rigid portion of the engine compartment splash panel 15 may be somewhat flexible, but it is rigid enough that it could, for example, be supported only by a lower edge with upper portions of this substantially rigid portion extending above the lower edge and supported only by lower portions of this substantially rigid portion. There may also be relatively flexible components such as flexible splash panel extensions and sound insulating material attached to the substantially rigid portion of the engine compartment splash panel. Additionally, one or more locating features 17, which preferably include one or more spring clips 12, one or more clip engagement structures 14, one or more male panel-locating features 35, and/or one or more female panel-locating features 36 of the panel-mounting structure 13 are rigidly mounted to or defined by the substantially rigid portion of the engine compartment splash panel 15. As a result of the rigid construction of this portion of the engine compartment splash panel 15 and the rigid engagement of these locating features 17 to the substantially rigid portion of the engine compartment splash panel 15, these locating features 17 have substantially fixed positions and orientations relative to one another. By grasping any part of the substantially rigid portion of such an engine compartment splash panel 15 and manipulating its position and orientation an individual can also effectively manipulate the position and orientation of the locating features 17 that are rigidly mounted to or defined by it. In contrast, some prior art engine compartment splash panels 15 had a plurality of locating features such as spring clips 12 engaged to flexible portions of the engine compartment splash panel 15 such as a sheet of elastomer material. In order to manipulate the position and orientation of the spring clips 12 of such a prior art engine compartment splash panel 15 an individual would have to grasp and manipulate either the spring clip 12 itself, or a portion of the flexible engine compartment splash panel 15 directly adjacent the spring clip 12. Thus, for assemblies constructed according to the present invention, the process of aligning and engaging the panel-mounting structure 13 of the engine compartment splash panel 15 to the panel-mounting structure 13 of the panel-support components 16 is much less cumbersome than the same process for prior art engine compartment splash panels of flexible construction.

As was mentioned above, the preferred embodiment of the panel-mounting structure 13 includes one or more complimentary pairs of slide-to-engage panel-locating features 34. In the preferred embodiment, one or more of the complimentary pairs of slide-to-engage panel-locating features 34 comprise a female panel-locating feature 36 that is a panel-locating channel structure 25 and a complimentary male panel-locating feature 35 that is a tab 37. Each panel-locating channel structure 25 comprises a channel base wall 26 from which two channel side walls 27 extend in a same general direction and in positions such that they are spaced relative to one another in directions perpendicular to those in which they extend. In the preferred embodiment each of the panel-locating channel structures 25 of the one or more complimentary pairs of slide-to-engage panel-locating features 34 is mounted to or defined by the panel-support components 16. Also, in the preferred embodiment, the one or more tabs 37 of each of the one or more complimentary pairs of slide-to-engage panel-locating features 34 is defined by a portion of the outer peripheral structure of the rigid portion of the engine compartment splash panel 15. An engine compartment splash panel 15 that has such tabs 37 properly engaged to panel-locating channel structures 25, is prevented from translating substantially in directions perpendicular to the channel side walls 27 of those panel-locating channel structures 25. The panel-mounting structure 13 may have panel-locating channel structures 25 which have channel side walls 27 that extend in any direction. In the preferred embodiment, the panel-support components 16 of the panel-mounting structure 13 include two or more panel-locating channel structures 25 that have channel side walls 27 that extend vertically upward from their respective channel base walls 26. Also, in the preferred embodiment the tabs 37 that are engaged to these two or more vertically upwardly extending panel-locating channel structures 25, when the engine compartment splash panel 15 is mounted in its in-service position, are defined by part of the substantially rigid portion of the engine compartment splash panel 15 adjacent its lower edge.

Figure 6A:
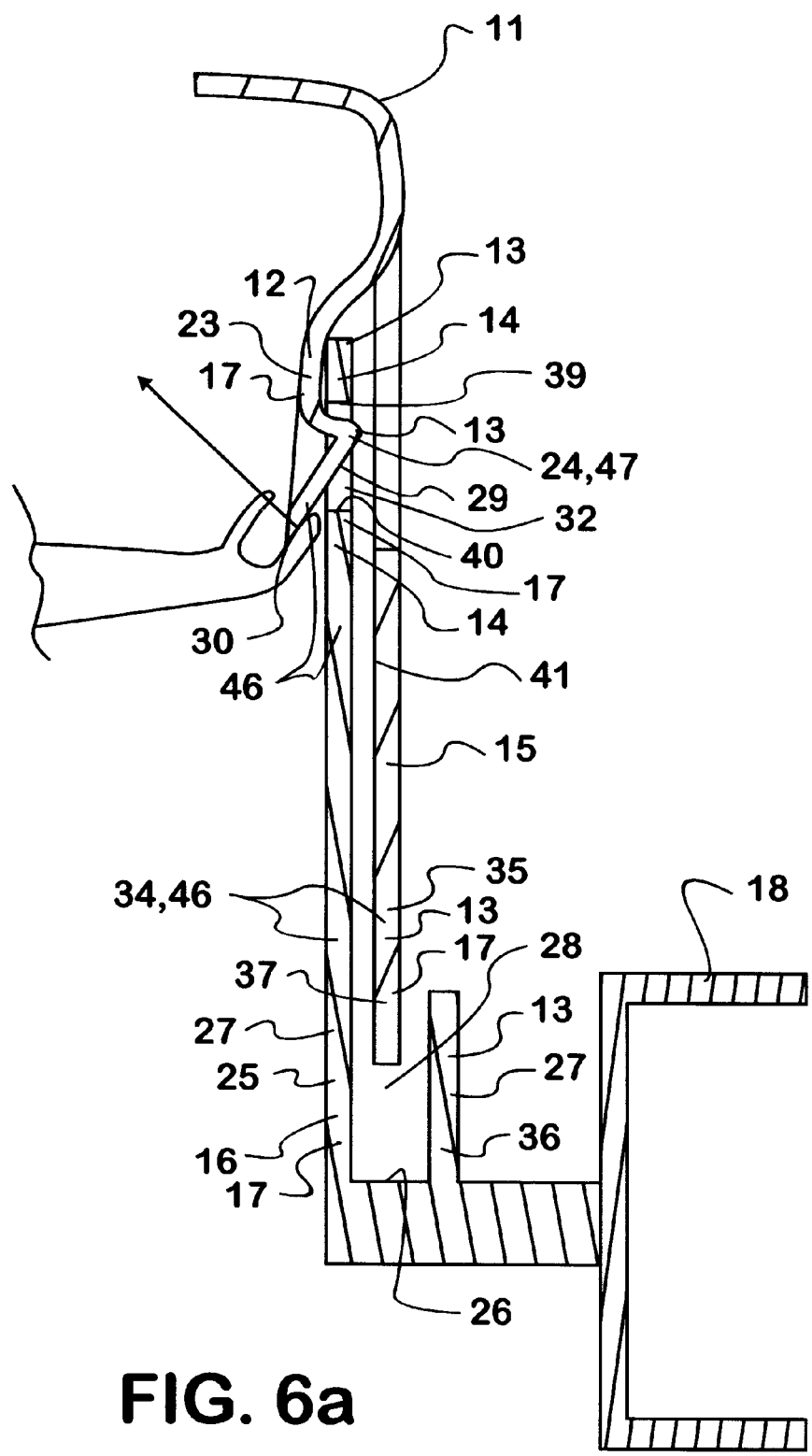
FIG. 6a is a sectional view showing an early stage in a process of dismounting an engine compartment splash panel from panel-support components.
Figure 6C:
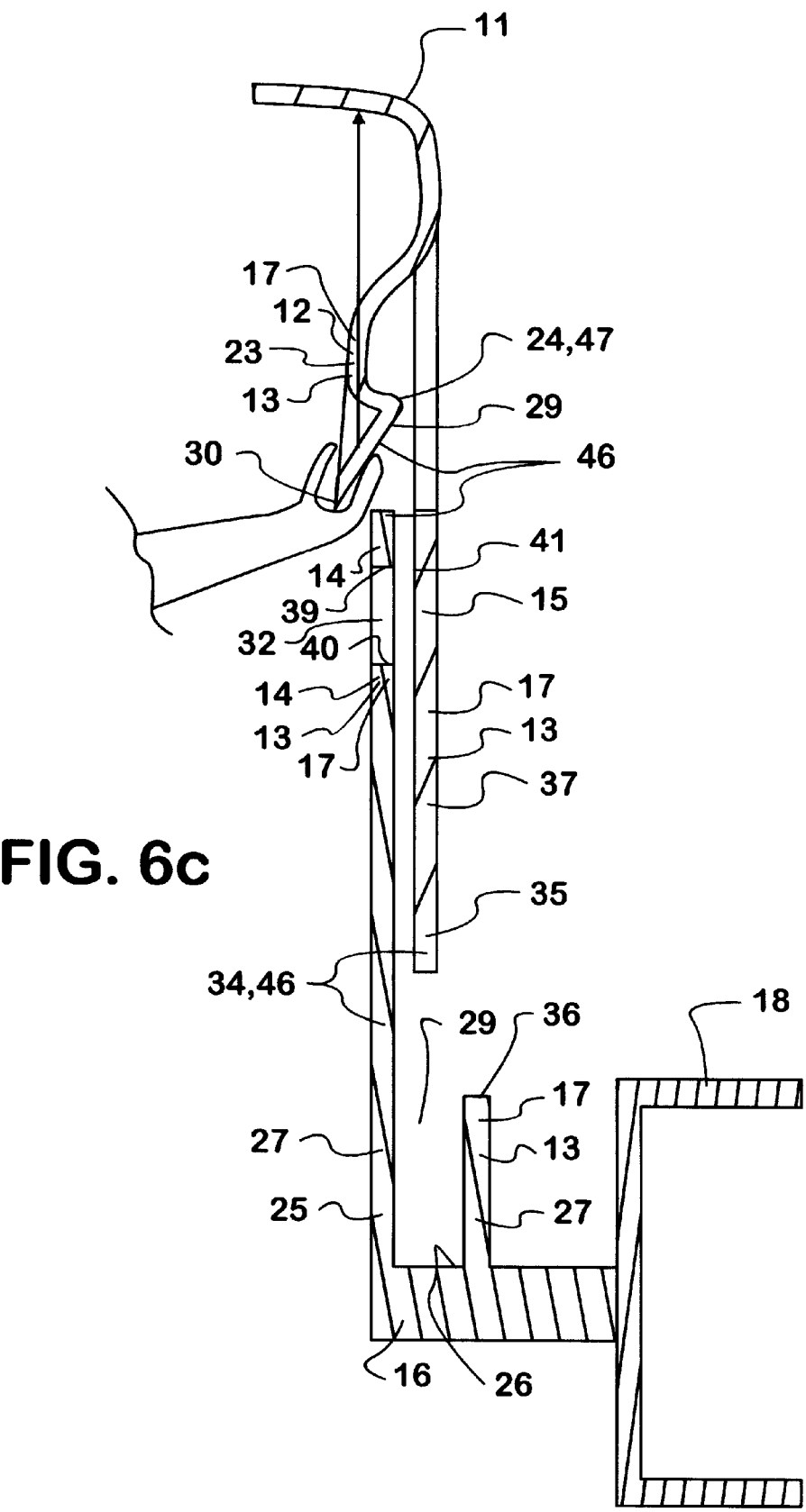
FIG. 6c is a sectional view showing a final stage in a process of dismounting an engine compartment splash panel from panel-support components.
Figure 7A:
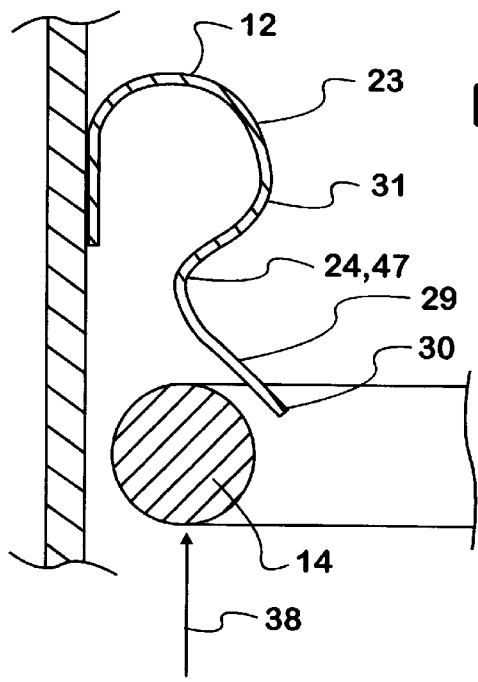
FIG. 7a is a sectional view showing an early stage in a process of engaging a spring clip that is self-camming in engagement to a complimentary clip engagement structure.
Figure 7C:
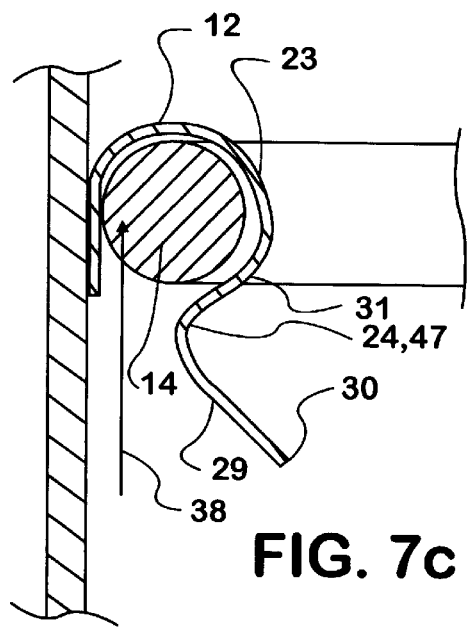
FIG. 7c is a sectional view showing a spring clip, that is self-camming in engagement, engaged to a clip engagement structure as a result of the process of which early and intermediate stages are illustrated in FIGS. 7a and 7b respectively.
Figure 7B:
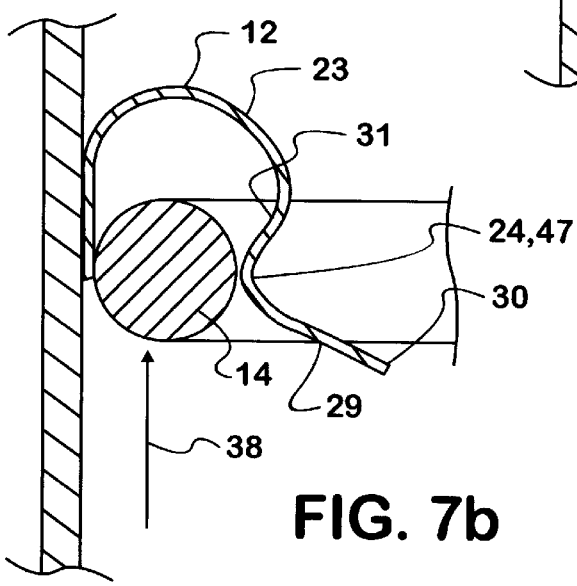
FIG. 7b is a sectional view showing an intermediate stage in a process of engaging a spring clip that is self-camming in engagement to a complimentary clip engagement structure.
Figure 8A:
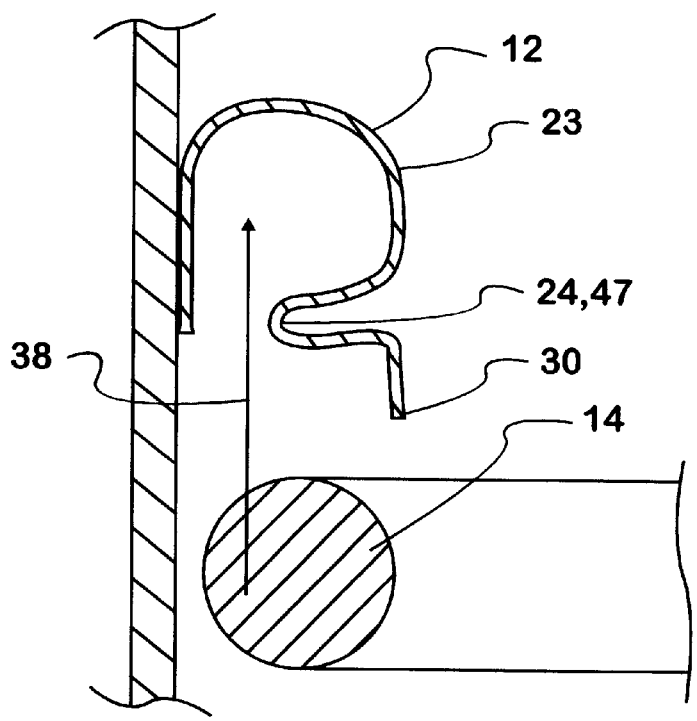
FIG. 8a is a sectional view of a spring clip that is not self-camming in engagement that is aligned with and ready to be engaged to the clip engagement structure shown.
Figure 8B:
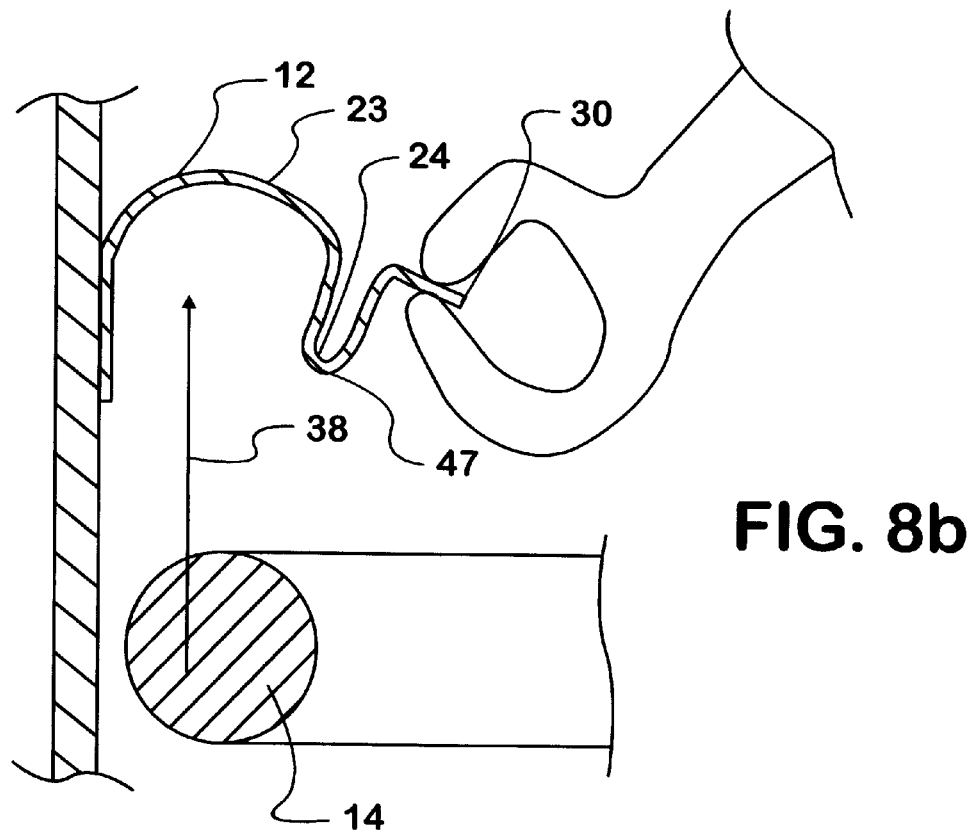
FIG. 8b is a sectional view showing an early stage of a process of engaging a spring clip that is not self-camming in engagement to a complimentary clip engagement structure.
Figure 8C:
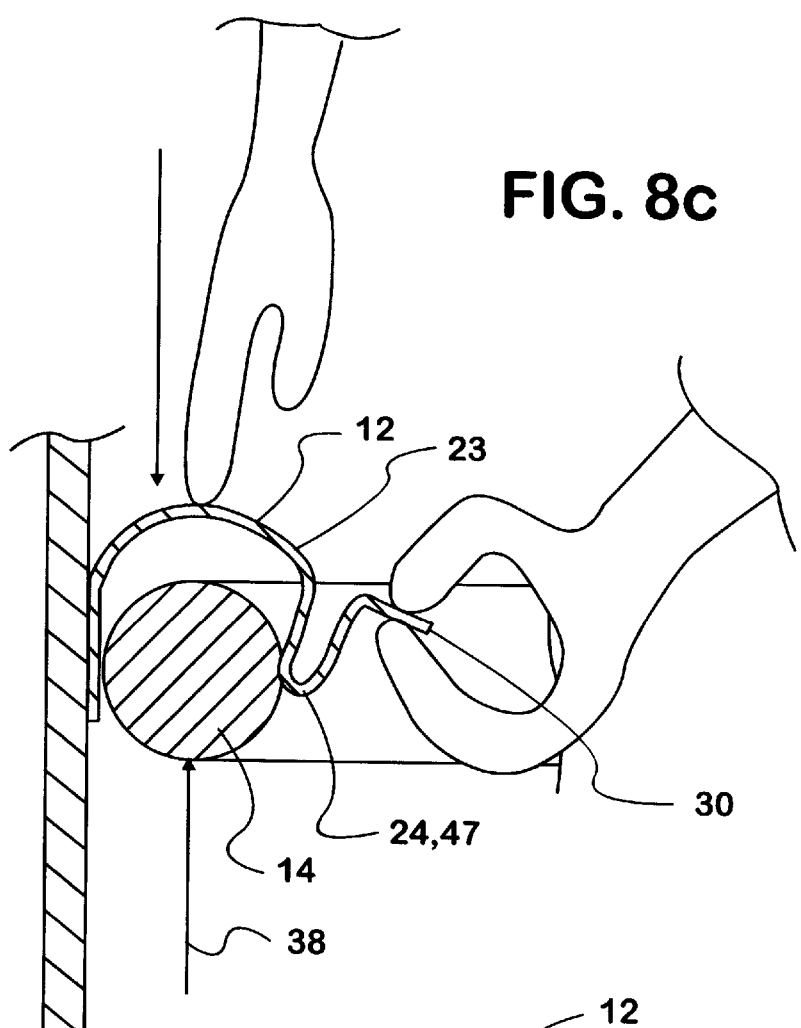
FIG. 8c is a sectional view showing an intermediate stage of a process of engaging a spring clip that is not self-camming in engagement to a complimentary clip engagement structure.
Figure 8D:
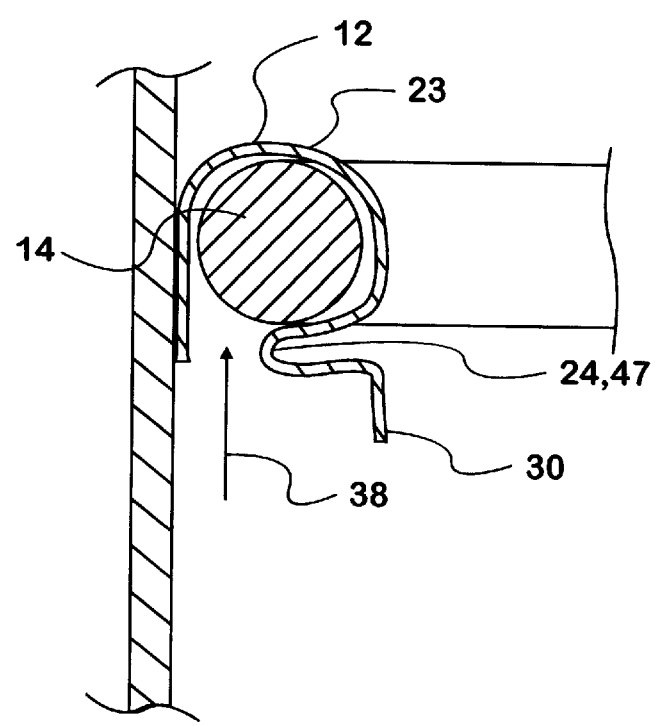
FIG. 8d is a sectional view of a spring clip that is not self-camming in engagement engaged to a complimentary clip engagement structure as a result of the process of which early and intermediate stages are illustrated in FIGS. 8b and 8c.
Figure 9A:
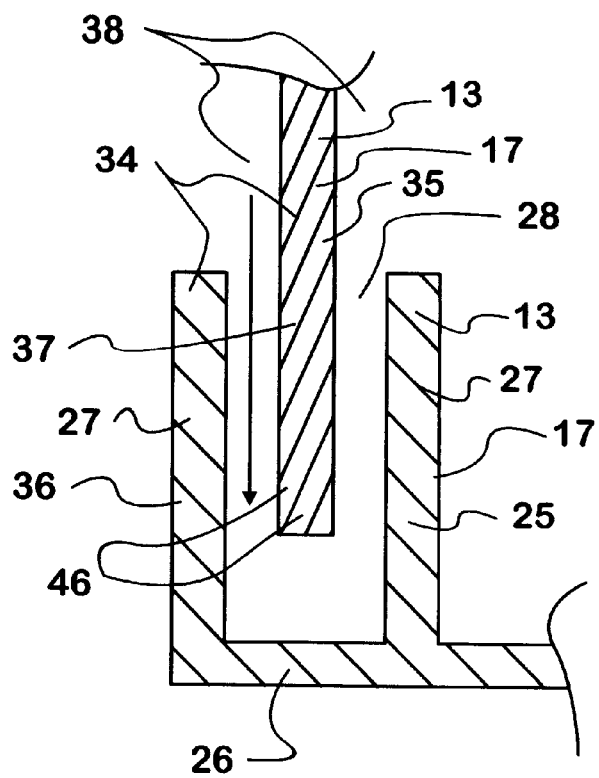
FIG. 9a is a sectional view showing a complimentary pair of slide-to-engage locating features, that comprise a male panel-locating feature that is a tab and a female panel-locating feature that is a panel-locating channel structure, engaged to one another.
Figure 9B:
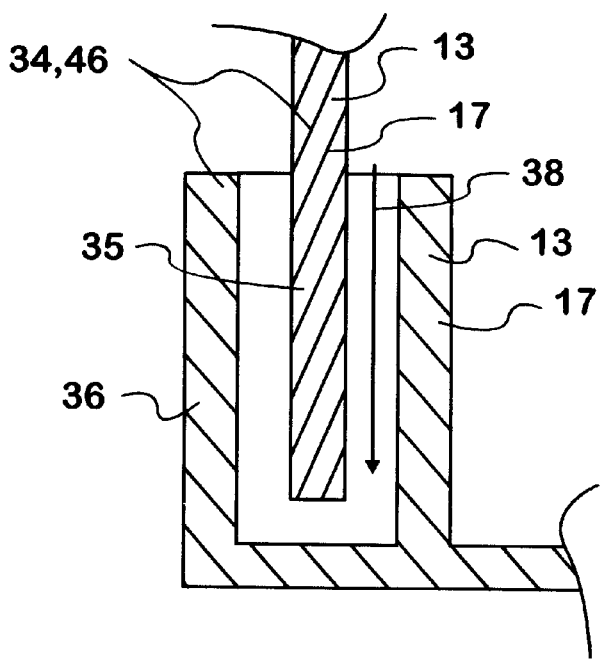
FIG. 9b is a sectional view showing a complimentary pair of slide-to-engage panel-locating features, that comprise a male panel-locating feature that is a pin engaged to a female panel-locating feature that defines a recess that surrounds the male panel-locating feature in two directions.
Figure 9C:
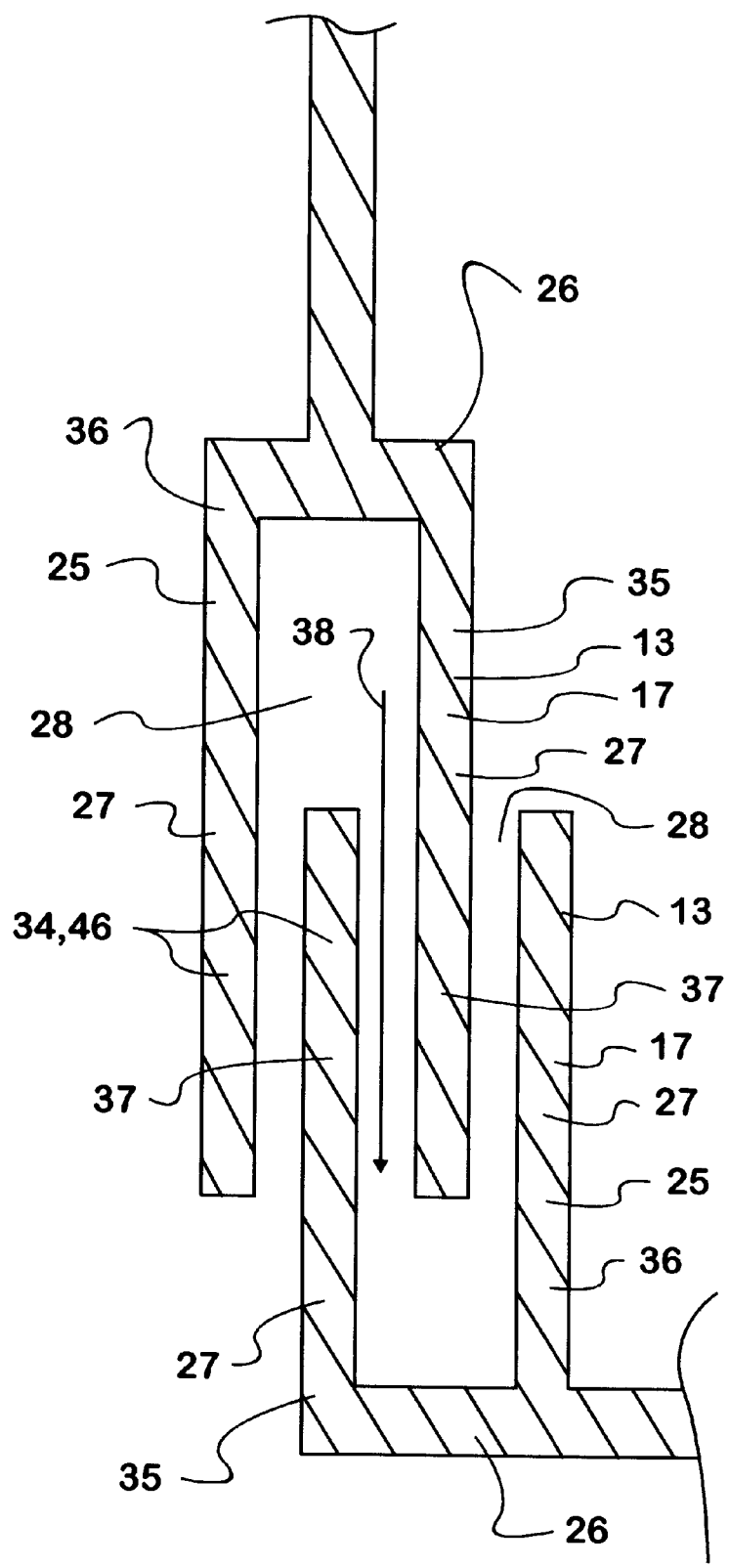
FIG. 9c shows a complimentary pair of slide-to-engage panel-locating features, that comprises two panel-locating features that are panel-locating channel structures, each of which acts as both a male panel-locating feature and a female panel locating feature, engaged to one another.

In the preferred embodiment of the present invention the locating features 17 of the panel-mounting structure 13 include one or more spring clips 12 that are self-camming in engagement. Those spring clips 12 that are self-camming in engagement have one or more leaf springs 23 that define outer camming surfaces 29 adjacent an outermost retention projection 47 that is defined by the respective leaf spring 23 that defines the outer camming surfaces 29. The outer camming surfaces 29 of such a spring clip 12 slope in a direction opposite of the direction that the adjacent retention projection 24 projects from the leaf spring 23 as the outer camming surfaces 29 extend away from the adjacent retention projection and toward the outer end 30 of the leaf spring 23 that defines them. The spring clips 12 shown in FIGS. 3a, 3c, 4a, 4b, 4c, 5a, 5b, 5c, 6a, 6c, 7a, 7b, 7c are self-camming in engagement because they have outer camming surfaces 29 that extend from a point adjacent an outermost retention projection 47 toward an outer end 30 of the leaf springs 23. The spring clips 12 shown in FIGS. 3b, 8a, 8b, and 8c are not self-camming in engagement because they do not have appropriate outer camming surfaces 29 to qualify them as self-camming in engagement. When the outer camming surfaces 29 of a spring clip 12 that is self-camming in engagement are pressed with sufficient force against outer surfaces of a complimentary clip engagement structure 14, an outer end 30 of the leaf spring 23 that defines the outer camming surfaces 29 elastically deforms in a direction opposite that which the outermost retention projection 47 extends from the leaf spring 23. As a spring clip 12 that is self-camming in engagement is pressed against a complimentary clip engagement structure 14 in such a manner, the leaf spring(s) 23 that define the outer camming surfaces 29 eventually elastically deform to such an extent that the outermost retention projection 47 and an outer portion of the clip engagement structure 14 may pass one another. Once the leaf springs 23 are elastically deformed to such an extent, the spring clip 12 may be slid into proper engagement with the complimentary clip engagement structure 14 by continued pressing of the spring clip 12 and the complimentary clip engagement structure 14 toward one another in their respective engagement direction 38. Successive steps in the process of engaging such a spring clip 12 that is self-camming in engagement to a complimentary clip engagement structure 14 are illustrated in FIGS. 7a, 7b, and 7c and also in FIGS. 5a, 5b, and 5c. Thus, a spring clip 12 that is self-camming in engagement may be engaged to a complimentary clip engagement structure 14 by simply pressing the spring clip 12 in the proper engagement direction 38 relative to the clip engagement structure 14. By contrast, in order to engage to one another a spring clip 12 that is not self-camming in engagement and a complimentary clip engagement structure 14, an individual must directly manipulate one or more of the leaf springs 23 of the spring clip 12. An individual must directly grasp one or more of the leaf springs 23, of such a spring clip 12 that is not self-camming in engagement, and elastically deform the leaf springs 23 in directions opposite which the retention projections 24 extend from the leaf spring 23 so that the retention projections 24 can be slid past portions of the clip engagement structure 14. Successive steps in the process of engaging a spring clip 12 that is not self-camming in engagement to a complimentary clip engagement structure 14 are illustrated in FIGS. 8a, 8b, 8c, and 8d.

One or more of the spring clips 12 of one or more complimentary pairs of a spring clip 12 and a clip engagement structure 14 of the panel-mounting structure 13 may also be self-camming in disengagement. A spring clip 12 that is self-camming in disengagement has one or more leaf springs 23 that define inner camming surfaces 31 adjacent to an outermost retention projection 47 defined by the leaf spring 23. The inner camming surfaces 31 of such a spring clip 12, that is self-camming in disengagement, slope in a direction opposite the direction in which the retention projection 24 which they are disposed adjacent to projects from the leaf spring 23, as they extend away from the adjacent retention projection 24 and away from an outer end 30 of the leaf spring 23 that defines them. Thus, spring clips 12 that are self-camming in disengagement can be disengaged from a complimentary clip engagement structure 14 simply by pulling the spring clip 12 in a direction opposite the engagement direction of the spring clip 12 and the clip engagement structure 14 without directly manipulating any of the leaf springs 23 of the spring clip 12. This is similar to the method by which a spring clip 12 that is self-camming in engagement can be engaged to a complimentary clip engagement structure 14 without directly manipulating any of the leaf springs 23 of the spring clip 12. Spring clips 12 that are self-camming in disengagement are shown in FIGS. 3a, 3b, 3c, 7a, 7b, and 7c. Spring clips 12 that are not self-camming in disengagement are illustrated in FIGS. 4a, 4b, 4c, 5a, 5b, 5c, 6a, 6b, 6c, 8a, 8b, 8c, and 8d. In general, it is preferred that the spring clips 12 of the panel-mounting structure 13 not be self-camming in disengagement because use of spring clips 12 that are self-camming in disengagement increases the probability that the spring clips 12 will inadvertently disengage from their complimentary clip engagement structures 14.

Figure 5C:
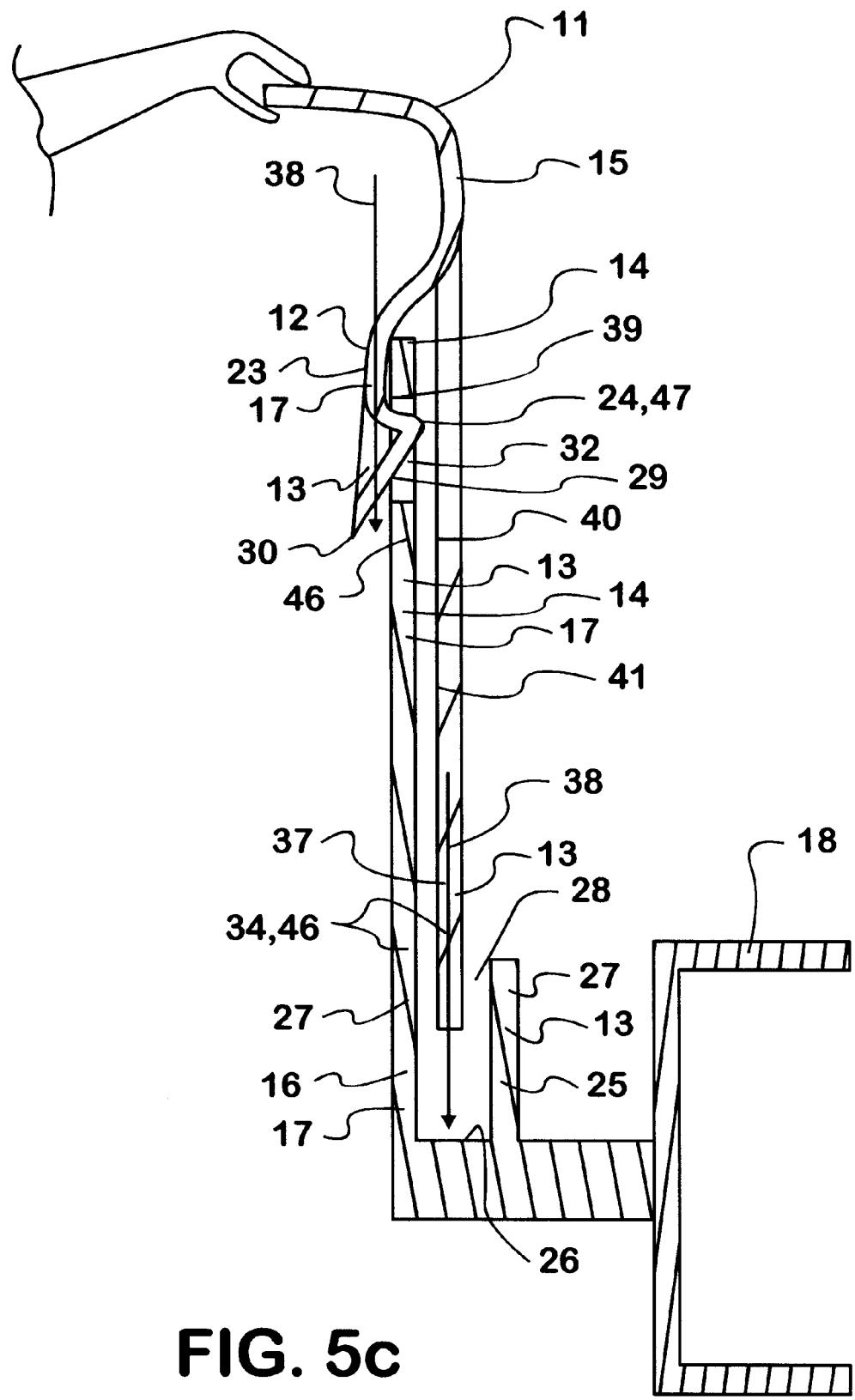
FIG. 5c is a sectional view showing the engagement of an engine compartment splash panel to panel-support components as a result of the mounting process of which early and intermediate stages are illustrated in FIGS. 5a and 5b respectively.

The panel-mounting structure 13 may be constructed in such a manner that it includes one or more complimentary pairs of a spring clip 12 and a clip engagement structure 14 that may be aligned and engaged to one another by manipulating any part of the substantially rigid portion of the engine compartment splash panel 15. The panel-mounting structure 13 may include one or more complimentary pairs of a spring clip 12 and a clip engagement structure 14 that have either their spring clip 12 or their clip engagement structure 14 rigidly mounted to or defined by the substantially rigid portion of the engine compartment splash panel 15 and the complimentary clip engagement structure 14 or spring clip 12 rigidly mounted to or defined by the panel-support components 16. The spring clips 12 of one or more complimentary pairs of a spring clip 12 and a clip engagement structure 14 that are mounted to and/or defined by the engine compartment splash panel 15 and the panel-support components 16 in such a way may be spring clips 12 that are self-camming in engagement. Any complimentary pairs of a spring clip 12 and a clip engagement structure 14 constructed and rigidly mounted to and/or defined by the engine compartment splash panel 15 and the panel-support components 16 as described immediately above can be engaged to one another by simply grasping and manipulating any part of the substantially rigid portion of the engine compartment splash panel 15. For instance, panel-mounting structure 13 constructed in such a manner may include a spring clip 12 that is self-camming in engagement and that is rigidly mounted to the substantially rigid portion of the engine compartment splash panel 15. An individual may grasp any part of the substantially rigid portion of the engine compartment splash panel 15, to which the spring clip 12 is mounted, and align the spring clip 12 with a complimentary clip engagement structure 14 that is mounted to or defined by the panel-support components 16, by simply manipulating the position and orientation of the entire engine compartment splash panel 15. Subsequently, the individual can manipulate the engine compartment splash panel 15 to bring the outer camming surfaces 29 of the spring clip 12 into abutment with outer edges of the complimentary clip engagement structure 14 that is mounted to or defined by the panel-support components 16. Finally, the individual can urge the engine compartment splash panel 15 in the engagement direction 38 of the complimentary pair of a spring clip 12 and a clip engagement structure 14 in order to engage the spring clip 12 to the clip engagement structure 14. When the individual urges the engine compartment splash panel 15 in such a direction, the engine compartment splash panel 15, in turn, urges the spring clip 12 in the engagement direction 38 toward the complimentary clip engagement structure 14 that is mounted to or defined by the panel-support components 16. Because the spring clip 12 is self-camming in engagement, the urging of the spring clip 12 toward the complimentary clip engagement structure 14 in such a manner will result in the spring clip 12 sliding into engagement with the clip engagement structure 14. Successive steps in such a process of mounting an engine compartment splash panel 15 that is constructed in such a manner to panel-support components 16 that are constructed in such a manner are illustrated in FIGS. 5a, 5b, and 5c. It will be understood that there are a number of different possible constructions of the panel-mounting structure 13 that would allow for such a method of mounting the engine compartment splash panel 15 to the panel-support components 16. Such an attachment method would be enabled by panel-mounting structure 13 that includes spring clips 12 that are self-camming in engagement mounted to and/or defined by the substantially rigid portion of the engine compartment splash panel 15 exclusively and complimentary clip engagement structures 14 mounted to and/or defined by the panel-support components 16 exclusively. Such an attachment method would also be enabled by panel-mounting structure 13 that includes spring clips 12 that are self-camming in engagement mounted to and/or defined by the panel-support components 16 exclusively and complimentary clip engagement structures 14 mounted to and/or defined by the engine compartment splash panel 15 exclusively. Such an attachment method would also be enabled by panel-mounting structure 13 constructed with spring clips 12 and clip engagement structures 14 mounted to and/or defined by the rigid portion of the engine compartment splash panel 15 and with complimentary clip engagement structures 14 and spring clips 12 mounted to and/or defined by the panel-support components 16.

The male panel-locating feature 35 and the female panel-locating feature 36 of each of the complimentary pairs of slide-to-engage panel-locating features 34 of the panel-mounting structure 13 of the preferred embodiment can be engaged to one another simply by manipulating the position and orientation of the engine compartment splash panel 15. In the preferred embodiment all of the male panel-locating features 35 and the female panel-locating features 36 of the one or more complimentary pairs slide-to-engage panel-locating features 34 are rigidly located relative to whichever of the engine compartment splash panel 15 and the panel-support components 16 that they are mounted to and/or defined by. As a result an individual can manipulate the position and orientation of all of the male panel-locating features 35 and female panel-locating features 36 that are mounted to and/or defined by the rigid portion of the engine compartment splash panel 15, by manipulating the position and orientation of the rigid portion of the engine compartment splash panel 15. Thus, an individual can, by manipulating the position and orientation of the rigid portion of the engine compartment splash panel 15, align any male or female panel-locating feature 35, 36 that is mounted to or defined by it to a complimentary female or male panel-locating feature 36, 35 that is mounted to or defined by the panel-support components 16. Subsequently the individual can move the rigid portion of the engine compartment splash panel 15 in the respective engagement direction 38 of the complimentary pair of slide-to-engage panel-locating features 34 and engage to one another the male or female panel-locating feature 35, 36 that is mounted to or defined by the engine compartment splash panel 15 and its complimentary female or male panel-locating feature 36, 35.

In the preferred embodiment, the engine compartment splash panel 15 and the panel-mounting structure 13 are constructed in such a manner that an individual can grasp any part of the substantially rigid portion of the engine compartment splash panel 15 and quickly and easily manipulate it to align and mount the engine compartment splash panel 15 to the panel-support components 16. In this embodiment, any spring clips 12, any clip engagement structures 14, any male panel-locating features 35, and/or any female panel-locating features 36 that are mounted to and/or defined by the engine compartment splash panel 15 have a substantially fixed position and orientation relative to the substantially rigid portion of the engine compartment splash panel 15. As a result, those spring clips 12, clip engagement structures 14, male panel-locating features 35, and/or female panel-locating features 36 that are mounted to and/or defined by the engine compartment splash panel 15 have fixed positions and orientations relative to one another. Also in this embodiment of the present invention, any spring clips 12, clip engagement structures 14, male panel-locating features 35, and/or female panel-locating features 36 that are mounted to and/or defined by the panel-support components 16 have a fixed position and orientation relative to one another. The relative positions of any spring clips 12, clip engagement structures 14, male panel-locating features 35, and/or female panel-locating features 36 that are mounted to and/or defined by the engine compartment splash panel 15 are the same as the relative positions of their complimentary locating features 17 that are mounted to and/or defined by the panel-support components 16. In other words, if a spring clip 12 and a clip engagement structure 14 that are mounted to and/or defined by the substantially rigid portion of the engine compartment splash panel 15 are spaced 8" apart from one another, their complimentary clip engagement structure 14 and spring clip 12 that are mounted to and/or defined by the panel-support components 16 are also spaced 8" apart from one another. In order to accommodate easy engagement of the engine compartment splash panel 15 to the panel-support components 16, all of the spring clips 12 of the panel-mounting structure 13 of the preferred embodiment are self-camming in engagement. Additionally, all of the complimentary pairs of a spring clip 12 and a clip engagement structure 14 and all of the complimentary pairs of slide-to-engage panel-locating features 34 of the panel-mounting structure 13 are constructed and oriented in such a manner that they all have at least one common engagement direction 38. In other words, each of the complimentary pairs of panel-locating features 46 is constructed and oriented in such a manner that they all have at least one engagement direction 38 that is parallel to a same common line and that extends in a same direction relative to the engine compartment splash panel 15 and a same opposite direction relative to the panel-support components 16. Such a construction of the panel-mounting structure 13 enables an individual to simultaneously align all of the locating features 17 that are mounted to and/or defined by the engine compartment splash panel 15 to all of their complimentary locating features 17 that are mounted to and/or defined by the panel-support components 16. An individual can simultaneously align the complimentary locating features 17 in such a manner by simply grasping and manipulating any part of the rigid portion of the engine compartment splash panel 15. Once the complimentary locating features 17 of the engine compartment splash panel 15 and the panel-support components 16 are aligned to one another in such a manner an individual can simultaneously engage all of the locating features 17 to one another by urging the engine compartment splash panel 15 in the common engagement direction 38 of the locating features 17. Successive steps in such a process of mounting such an engine compartment splash panel 15 to such a construction of panel-support components 16 are shown in FIGS. 5a, 5b, and 5c. The process of mounting such an engine compartment splash panel 15 to such a construction of panel-support components 16 in such a manner can be accomplished by grasping any part of the rigid portion of the engine compartment splash panel 15 and manipulating it.

There are many different constructions of the panel-mounting structure 13 that would provide at least one common engagement direction 38 for all of the complimentary pairs of panel-locating features 46 of the panel-mounting structure 13. In the preferred embodiment the leaf springs 23 of any spring clips 12 of the panel-mounting structure 13 that are mounted to and/or defined by the engine compartment splash panel 15 extend parallel to one another and in a same direction toward their outer ends 30 from the respective points at which they are engaged to the engine compartment splash panel 15. Additionally, in the preferred embodiment any male panel-locating features 35 that are mounted to and/or defined by the engine compartment splash panel 15 extend parallel to and in a same direction toward their free end as the leaf springs 23 of any spring clips 12 that are mounted to and/or defined by the engine compartment splash panel 15. In the preferred embodiment the leaf springs 23 of any spring clips 12 of the panel-mounting structure 13 that are mounted to and/or defined by the panel-support components 16 extend parallel to one another and in a same direction toward their outer ends 30 from the respective points at which they are engaged to the panel-support components 16. Additionally, in the preferred embodiment any male panel-locating features 35 that are mounted to and/or defined by the panel-support components 16 extend parallel to and in a same direction toward their free end as the leaf springs 23 of any spring clips 12 that are mounted to and/or defined by the panel-support components 16. When the engine compartment splash panel 15 is in its in-service position, any male panel-locating features 35 and/or leaf springs 23 of any spring clips 12 that are mounted to and/or defined by the engine compartment splash panel 15 extend in a direction opposite the direction in which any male panel-locating features 35 and/or leaf springs 23 of any spring clips 12 that are mounted to arid/or defined by the panel-support components 16 extend. As a result of such an arrangement of the locating features 17, any complimentary pairs of a spring clip 12 and a clip engagement structure 14 and any complimentary pairs of slide-to-engage panel-locating features 34 that the panel-mounting structure 13 comprises have at least one common engagement direction 38 shared by all of them.

The panel-mounting structure 13 of the present invention preferably has its spring clips 12 mounted to and/or defined by the engine compartment splash panel 15 and its clip engagement structures 14 mounted to and/or defined by the panel-support components 16 of the vehicle 10. In the preferred embodiment the panel-mounting structure 13 includes two or less spring clips 12, each of which is mounted to or defined by the engine compartment splash panel 15. Construction of the panel-mounting structure 13 with two or less spring clips 12 is beneficial because an individual can simultaneously manipulate with each of their hands each of the spring clips 12 of the panel-mounting structure 13. Each of the two or less spring clips 12 comprises a leaf spring 23 that extends substantially parallel to clip-opposing surfaces 41 of the engine compartment splash panel 15. It will be understood that the panel-mounting structure 13 may comprise a plurality of clip-opposing surfaces 41, various ones of which may be defined by different portions of the engine compartment splash panel 15. Each clip-opposing surface 41 of the panel-mounting structure 13 would complement and extend parallel to one or more leaf springs 23 of spring clips 12 of the panel-mounting structure 13. The leaf springs 23 of the two or less spring clips 12 also extend substantially parallel to one another and in a same direction from their respective points of engagement to the engine compartment splash panel 15. The direction in which the leaf springs 23 of these two or less spring clips 12 extend from the engine compartment splash panel 15 could be any direction. In the preferred embodiment the leaf springs 23 extend in such a direction that, when the engine compartment splash panel 15 is mounted in its in-service position, the leaf springs 23 extend vertically downward. Preferably the panel-support components 16 have a complimentary clip engagement structure 14 mounted to and/or defined by them for each of the two or less spring clips 12 that are mounted to and/or defined by the engine compartment splash panel 15. These clip engagement structures 14 that are mounted to and/or defined by the panel-support components 16 extend substantially parallel to one another. Such a construction of an engine compartment splash panel 15 may be properly mounted in its in-service position to such a construction of panel-support components 16 with each of the clip engagement structures 14 disposed between one of the leaf springs 23 of the spring clips 12 and complimentary clip-opposing surfaces 41 of the engine compartment splash panel 15. When the engine compartment splash panel 15 is engaged to the panel-support components 16 in such a way the engine compartment splash panel 15 is oriented in such a manner that each clip-opposing surface 41 is oriented substantially parallel to the direction in which the clip engagement structure 14 that is disposed between the clip-opposing surface 41 and the leaf spring 23 extends. It will be understood that, alternatively, it may be a clip engagement structure 14 and a portion of the panel-support components 16 that is directly or indirectly rigidly engaged to the clip engagement structure 14, that are captured between a respective leaf spring 23 and clip-opposing surfaces 41 of the engine compartment splash panel 15 in such a manner. Such a construction and engagement to one another of these components prevents substantial relative movement between the engine compartment splash panel 15 and the panel-support components 16 in directions perpendicular to the clip-opposing surfaces 41 between which and a leaf spring 23 clip engagement structures 14 are disposed. The direction in which the clip engagement structures 14 that are mounted to and/or defined by the panel-support components 16 extend parallel to one another may be any direction. In the preferred embodiment each of these two clip engagement structures 14 extend vertically upwardly from the panel-support components 16. FIGS. 5c and 6a show an engine compartment splash panel 15 of the preferred embodiment mounted to panel-support components 16 of the preferred embodiment which have clip engagement structures 14 that extend vertically upwardly. A retention projection 24 is defined by the leaf spring 23 of each of these spring clips 12 at a point distant from the point at which the leaf spring 23 is engaged to the engine compartment splash panel 15. The retention projection 24 of each of these leaf springs 23 protrudes from the leaf spring 23 toward clip-opposing surfaces 41, that are complimentary to the leaf spring 23, in a direction generally perpendicular to the direction in which the leaf spring 23 extends. Each of the clip engagement structures 14, of this embodiment, defines a retention recess 32 that extends into or through the clip engagement structure 14 in a direction perpendicular to that in which the clip engagement structure 14 extends. In the preferred embodiment, in which the clip engagement structures 14 extend vertically upwardly from the panel-support components 16, the retention recess 32 of each respective clip engagement structure 14 extends horizontally into or through the panel-support components 16. The retention recess 32 of each clip engagement structure 14 is bounded, in directions parallel to the direction in which the clip engagement structure 14 extends, by portions of the clip engagement structure 14 disposed upon opposite sides of the retention recess 32 in these directions. In the case of the preferred embodiment, each retention recess 32 is bounded in such a manner between an upper edge 39 of the retention recess 32 and a lower edge 40 of the retention recess 32 which are defined by portions of the clip engagement structure 14 disposed above and below the retention recess 32 respectively. When the engine compartment splash panel 15 of the preferred embodiment is properly mounted to the panel-support components 16, each of the retention projections 24 of its spring clips 12 protrudes, in a direction perpendicular to the direction in which the clip engagement structure 14 extends, into a retention recess 32 defined by one of the clip engagement structures 14. Thus, when the engine compartment splash panel 15 is properly mounted according to the preferred embodiment, the retention projection 24 of each spring clip 12 is bounded, in directions parallel to the direction in which the clip engagement structure 14 extends, between the portions of the clip engagement structure 14 that bound the retention recess 32 in these directions. Such an engagement of the retention projections 24 to the retention recesses 32 of the clip engagement structures 14 prevents substantial relative movement between the engine compartment splash panel 15 and the panel-support components 16, in directions parallel to the directions in which the clip engagement structures 14 extend. In the preferred embodiment, each retention projection 24 of the spring clips 12 is bounded between the upper edge 39 of a retention recess 32 and the lower edge 40 of a retention recess 32, when the engine compartment splash panel 15 is properly mounted in its in-service position. Such an engagement of the retention projection 24 to the clip engagement structures 14 prevents substantial vertical relative movement between the engine compartment splash panel 15 and the panel-support components 16. Each of FIGS. 4b, 5c, and 6c illustrates an engine compartment splash panel 15, panel-mounting structure 13, and panel-support components 16, constructed and engaged to one another according to the above-outlined guidelines. While not preferred, the panel-mounting structure 13 could include one or more constructions and engagements to one another of leaf springs 23, clip engagement structures 14 and clip-opposing surfaces 41 as outlined immediately above, wherein the clip engagement structures 14 are mounted to and/or defined by the engine compartment splash panel 15 in addition to or instead of the panel-support components 16. Such a construction of the panel-mounting structure 13 would, obviously, also include one or more leaf springs 23 and complimentary clip-opposing surfaces 41 mounted to and/or defined by the panel-support components 16 in addition to or instead of the engine compartment splash panel 15.

The panel-support components 16 of the preferred embodiment comprise two panel-mounting members 33. Each of the two panel-mounting members 33 is rigidly mounted to the vehicle 10. While the panel-mounting members 33 could extend in any direction from the point at which they are engaged to the vehicle 10, they preferably extend at least partially vertically upwardly from the point at which they are engaged to the vehicle 10. The panel-mounting members 33 may be mounted to any component of the vehicle 10 that is strong enough to support the panel-mounting members 33 and the engine compartment splash panel 15. In the preferred embodiment an upper end of each of the panel-mounting members 33 defines a clip engagement structure 14. Also, in the preferred embodiment a panel-locating channel structure 25 is mounted to a lower end of each of the panel-mounting members 33. Each of the panel-locating channel structures 25 mounted at the lower end of a panel-mounting member 33 preferably has its channel side walls 27 extending vertically upwardly from its channel base wall 26. When the engine compartment splash panel 15 of the preferred embodiment is mounted in its in-service position to the panel-mounting members 33, a spring clip 12 that is defined by the engine compartment splash panel 15 is engaged to each clip engagement structure 14 that is defined by an upper end of a panel-mounting member 33. Also, as described above, two parts of the rigid portion of the engine compartment splash panel 15 adjacent its lower edge function as tabs 37. When the engine compartment splash panel 15 is mounted in its in-service position, these parts of the rigid portion of the engine compartment splash panel 15 adjacent its lower edge that function as tabs 37 are disposed within panel-locating slots 28 defined by the panel-locating channel structures 25 mounted to the lower end of the panel-mounting members 33. Thus, these tabs 37 and the panel-locating channel structures 25 mounted to the lower ends of the panel-mounting members 33 constitute two complimentary pairs of slide-to-engage panel locating features 34.

Successive steps in the process of mounting an engine compartment splash panel 15 constructed according to the preferred embodiment of the present invention to panel-support components 16 constructed according to the preferred embodiment of the present invention are illustrated in FIGS. 5a, 5b and 5c. FIG. 5a shows an individual grasping an upper part of the rigid portion of such an engine compartment splash panel 15 that is positioned with the locating features 17 of the engine compartment splash panel 15 aligned and ready to be engaged to the locating features 17 of the panel-mounting members 33. In FIG. 5a the engine compartment splash panel 15 is positioned such that the outer camming surfaces 29 of each of its spring clips 12, which are self-camming in engagement, are disposed directly vertically above the clip engagement structures 14 that extend vertically upwardly from the panel-mounting members 33. Also, at this stage in the mounting process the position of the engine compartment splash panel 15 is such that an upper portion of each clip engagement structure 14 is aligned vertically below and horizontally between each of the leaf springs 23 of the spring clips 12 and the clip-opposing surfaces 41 that are complimentary to the spring clips 12. Additionally, a lower edge of the substantially rigid portion of the engine compartment splash panel 15 is disposed directly vertically above the vertically upwardly extending panel-locating channel structures 25 that are mounted to the lower end of each of the panel-mounting members 33. Once the engine compartment splash panel 15 is positioned and oriented relative to the panel-mounting members 33 in the manner shown in FIG. 5a, the individual grasping the upper part of the substantially rigid portion of the engine compartment splash panel 15 urges it vertically downwardly. As the engine compartment splash panel 15 is urged vertically downwardly the outer camming surfaces 29 of its spring clips 12 contact upper portions of the clip engagement structures 14 that extend vertically upwardly from the panel-mounting members 33. As the engine compartment splash panel 15 is urged vertically downwardly with increasing force, the abutment between the outer camming surfaces 29 of the spring clips 12 and the upper portions of the clip engagement structures 14 causes the leaf springs 23 to elastically deform horizontally away from the clip engagement structures 14. Eventually the leaf springs 23 of the spring clips 12 deform far enough that the retention projection 24 defined by each leaf spring 23 can slide past an upper portion of the clip engagement structure 14 which the leaf spring 23 is in contact with. FIG. 5b illustrates the stage in the process of mounting the engine compartment splash panel 15 during which an individual is urging the engine compartment splash panel 15 vertically downwardly and the retention projections 24 of the spring clips 12 are sliding past upper portions of the clip engagement structures 14. Simultaneously, each of the clip engagement structures 14 slides between the respective leaf spring 23 with which it is in contact and the clip-opposing surfaces 41 that are complimentary to that respective leaf spring 12. Subsequently, the engine compartment splash panel 15 is continually urged vertically downwardly until each of the retention projections 24 of the spring clips 12 have slid completely past an upper portion of a respective clip engagement structure 14. Once a retention projection 24 has slid past a respective upper portion of a clip engagement structure 14, the leaf spring 23 of the spring clip 12 that defines that retention projection 24 springs horizontally back toward its free position relative to the engine compartment splash panel 15, which is closer to the clip engagement structure 14. When a spring clip 12 springs back toward its free state the retention projection 24 defined by the leaf spring 23 of the spring clip 12 springs into and thereafter protrudes into the retention recess 32 of a respective clip engagement structure 14. Once the retention projections 24 of the spring clips 12 are disposed in such a manner within a retention recess 32, they are bounded between an upper edge 39 of the retention recess 32 and a lower edge 40 of the retention recess 32 and substantial vertical relative movement between the engine compartment splash panel 15 and the panel-mounting members 33 is prevented. Once each of the spring clips 12 is engaged to each of the clip engagement structures 14 in such a manner, each of the clip engagement structures 14 and the panel-mounting members 33 that they are engaged to are captured horizontally between the leaf springs 23 of the spring clips 12 and substantially vertically oriented clip-opposing surfaces 41 of the engine compartment splash panel 15. As a result, the portion of the engine compartment splash panel 15 adjacent each of the spring clips 12 is prevented from moving substantially in horizontal directions relative to the panel-mounting members 33. Approximately simultaneous to the spring clips 12 becoming engaged to the clip engagement structures 14 defined by the panel-mounting members 33, a lower edge of the substantially rigid portion of the engine compartment splash panel 15 moves vertically downwardly into panel-locating slots 28 defined by the panel-locating channel structures 25 mounted to the lower end of each of the panel-mounting members 33. The engagement of the lower edge of the substantially rigid portion of the engine compartment splash panel 15 to the panel-locating channel structures 25 in such a manner prevents any substantial horizontal movement of the lower portion of the engine compartment splash panel 15 relative to the panel-mounting members 33. As was mentioned above, each one of two portions of the substantially rigid portion of the engine compartment splash panel 15 adjacent its lower edge that act as tabs 37 in combination with one of the panel-locating channel structures 25 mounted to the lower end of each of the panel-mounting members 33 constitutes a complimentary pair of slide-to-engage panel locating features 34. FIG. 5c illustrates the engine compartment splash panel 15 of the preferred embodiment properly mounted in its in-service position as described above to the panel-mounting members 33 as a result of the mounting process illustrated in FIGS. 5a and 5b.

Successive stages in the process of dismounting the engine compartment splash panel 15 according to the preferred embodiment from the panel-support components 16 of the preferred embodiment are illustrated in FIGS. 6a, 6b, and 6c. FIG. 6a illustrates the first stage in such a process of dismounting the engine compartment splash panel 15. In FIG. 6a an individual is grasping an outer end 30 of the leaf spring 23 of each of the spring clips 12 and elastically deforming the outer end 30 horizontally away from the clip engagement structure 14 to which each respective spring clip 12 is/was engaged. The individual would elastically deform each of the leaf springs 23 in such a manner until the retention projection 24 defined by each leaf spring 23 is disposed outside of the retention recess 32 within which the retention projection 24 was disposed. Once each of the leaf springs 23 is deformed to such an extent, the individual may apply a force vertically upwardly to each of the leaf springs 23 to cause the engine compartment splash panel 15 to move vertically upwardly as each of the retention projections 24 of the spring clips 12 slide past upper portions of the respective clip engagement structures 14. This stage in the process of dismounting the engine compartment splash panel 15 is illustrated in FIG. 6b. Once each of the retention projections 24 has passed the upper portion of each respective clip engagement structure 14, the individual may lift the engine compartment splash panel 15 entirely from the panel-mounting members 33 and place it wherever they choose, as is illustrated in FIG. 6c.

In the preferred embodiment each of the two spring clips 12 of the panel-mounting structure 13 is defined by the substantially rigid portion of the engine compartment splash panel 15 as opposed to being constructed of a separate component that is mounted to the engine compartment splash panel 15. In this embodiment the substantially rigid portion of the engine compartment splash panel 15 is formed of a sheet of material such as plastics, fiberglass, metals or other materials having mechanical properties similar to these materials. The spring clips 12 are formed integrally with the substantially rigid portion of the engine compartment splash panel 15 when it is created using processes which may include but are not limited to molding and stamping. The construction of the spring clips 12 integral to the substantially rigid portion of the engine compartment splash panel 15 in such a manner is cost effective because it reduces the material and labor costs of construction and assembly as compared to creating spring clips 12 separate from the engine compartment splash panel 15 and subsequently mounting them to it.

Figure 10:
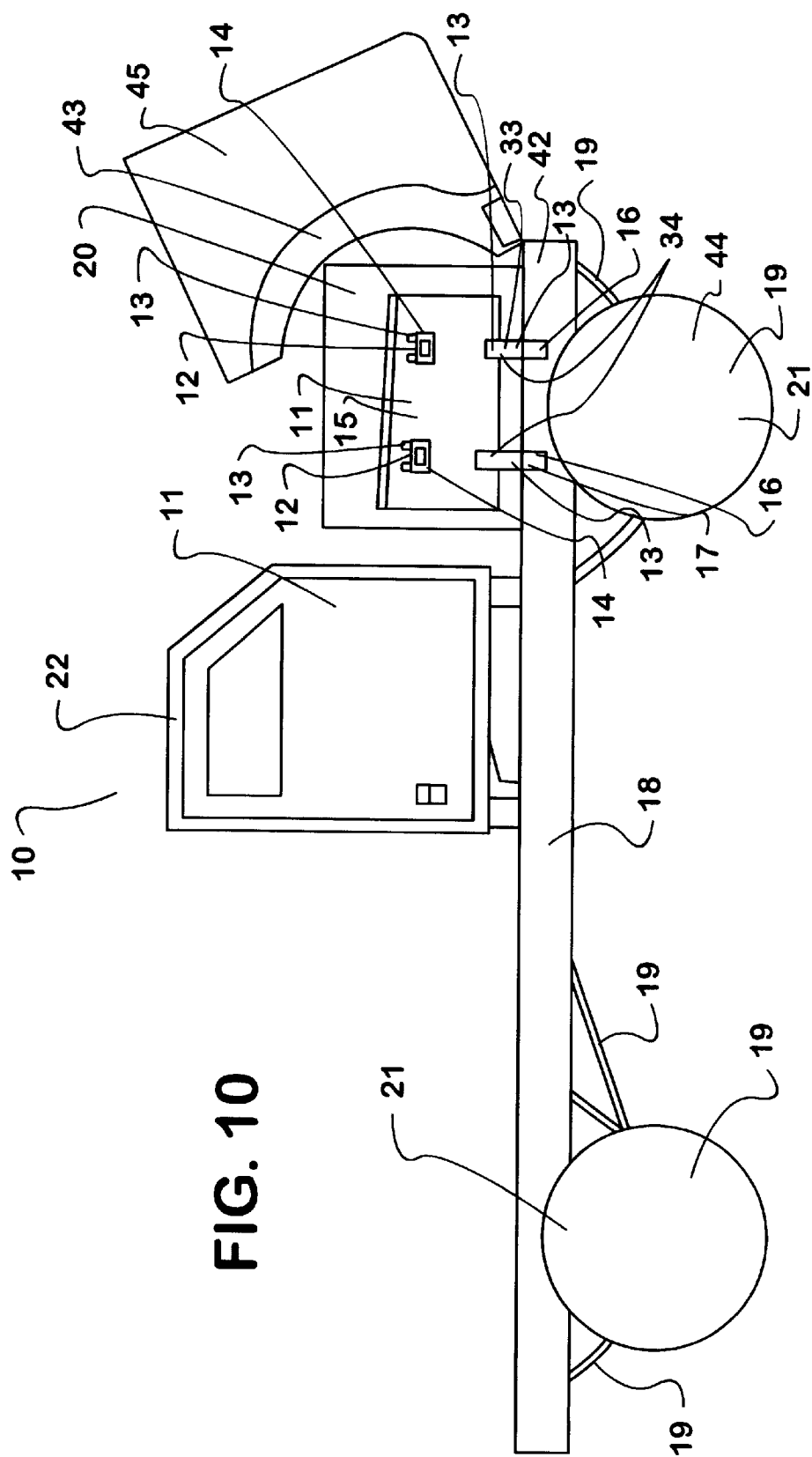
FIG. 10 is a side view of a vehicle according to the present invention with its engine compartment hood tilted to an open position.
Figure 11:
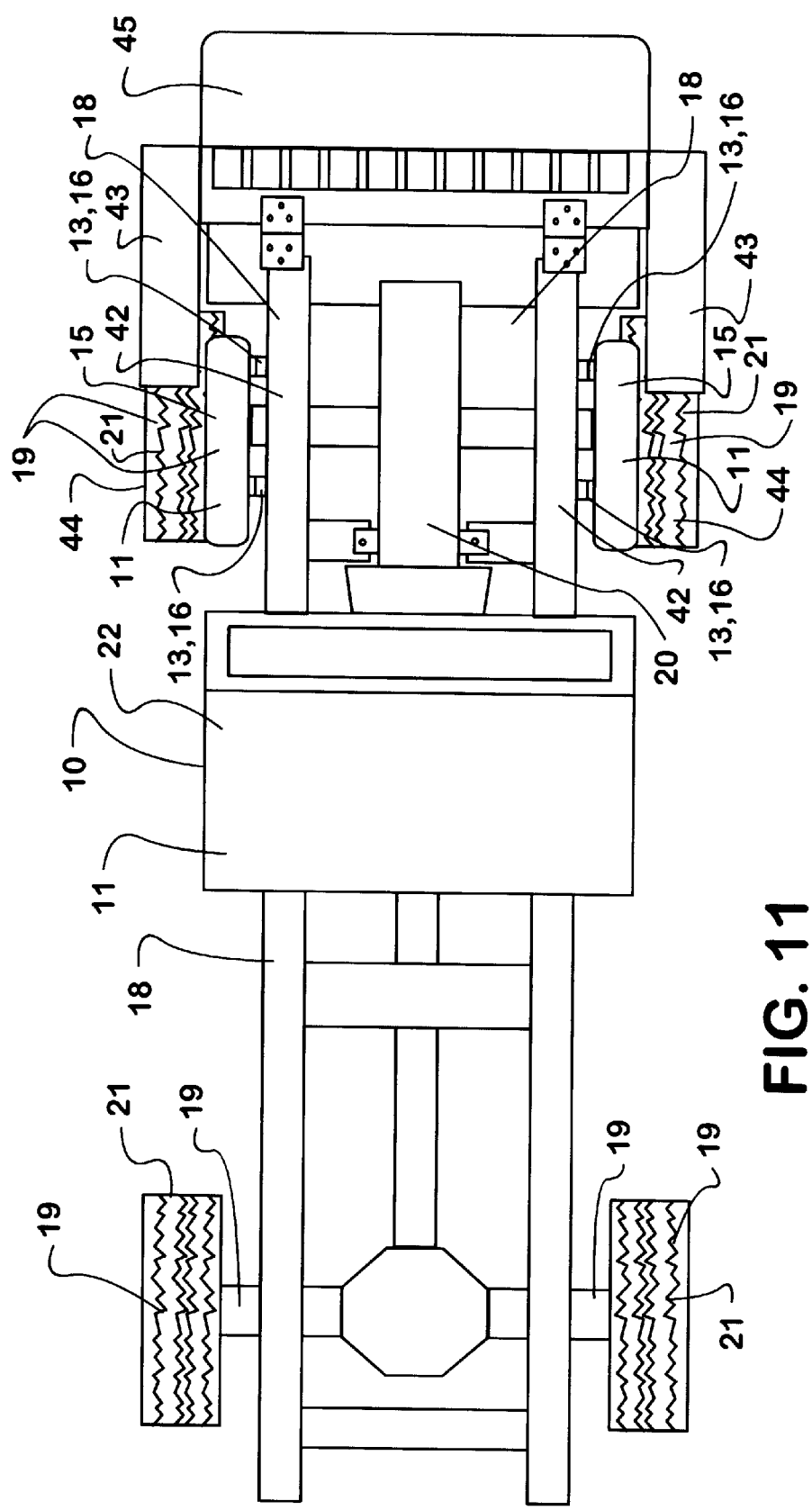
FIG. 11 is a top view of the vehicle shown in FIG. 10.

As was mentioned above, the engine compartment splash panel 15, the panel-support components 16, and the panel-mounting structure 13 of the present invention may be utilized on vehicles 10 constructed in any of a number of different ways. The construction of these components according to the present invention is, however, particularly useful on vehicles 10 that are constructed similar to commercial truck vehicles 10 of the conventional type. A commercial truck vehicle 10 of the conventional type is illustrated in FIG. 10. Such vehicles 10 generally have a frame structure 18 that extends substantially the entire length of the vehicle 10, an engine 20 that is mounted to a front portion 42 of the frame structure 18 of the vehicle 10, and an operator cabin 22 that is mounted to a portion of the frame structure 18 immediately behind the portion to which the engine 20 is mounted. Such vehicles 10 also generally includes two front wheels 44 of the suspension system 19 that are disposed adjacent the front portion 42 of the frame structure 18 and each of which is disposed upon laterally opposite sides of the frame structure 18. Each of the front wheels 44 is, thus, located near the engine 20 of the vehicle 10. Similar to many vehicles 10, such vehicles 10 also generally include two front fender panels 43 that surround the front wheels 44 in certain directions when the front fender panels 43 are in their in-service position. Such vehicles 10 also comprise an engine compartment hood 45 that is disposed above and covers the engine 20 when the engine compartment hood 45 is in a closed position. In contrast to many vehicles 10, commercial truck vehicles 10 of the conventional type often have the front fender panels 43 rigidly engaged to the engine compartment hood 45. The engine compartment hood 45 and the front fender panels 43 are constructed in such a manner that, when the engine compartment hood 45 is closed, the front fender panels 43 are disposed in their in-service position. As a result, when the engine compartment hood 45 is moved away from its closed position as by pivoting about a mounting point or by removing the engine compartment hood 45 from the vehicle 10, so that an individual can gain access to components under the engine compartment hood 45, the front fender panels 43 move with the engine compartment hood 45 out of their in-service position. Thus, when the engine compartment hood 45 of such a vehicle 10 is opened or removed, the two front fender panels 43 move away from the two front wheels 21 and it is relatively easy for an individual to access and in some cases stand in the area outboard of the front portion 42 of the frame structure 18 and adjacent the front wheels 44. The inclusion of an engine compartment splash panel 15, panel-support components 16, and panel-mounting structure 13 according to the present invention on such a vehicle 10 provides a number of advantages. When the engine compartment splash panel 15 is mounted to the vehicle 10 in its in-service position between a front wheel 44 and the engine 20, it prevents at least some of the debris and water flung from the front wheel 44 from entering the area directly adjacent the engine 20 and damaging or interacting in an undesirable manner with the engine 20 and other adjacent components. When the engine compartment hood 45 is open or removed from the vehicle 10 an individual can quickly and easily move the engine compartment splash panel 15 of the present invention from its in-service position so that the individual can access the engine 20 and adjacent components from the area adjacent a front wheel 44. Subsequently, when the individual has completed whatever procedures they performed that required access to the engine 20 and/or adjacent components, the engine compartment splash panel 15 of the present invention may be quickly and easily remounted in its in-service position to the vehicle 10.

It will be understood by those skilled in the art that in some instances some features of the invention will be employed without a corresponding use of other features. It will also be understood by those skilled in the art that modifications could be made to the invention as described without departing from the spirit and scope of the invention and thus the scope of the invention is limited only by the following claims.

We claim:

1. A vehicle, comprising:
   (a) one or more relatively strong frame structures to which a large percentage of other components of said vehicle are engaged and from which a large percentage of other components of said vehicle derive support;
   (b) a suspension system to which said one or more frame structures are engaged and from which said one or more frame structures derive support;
   (c) an operator cabin that is engaged to and supported by one or more of said one or more frame structures;
   (d) an engine that is engaged to and supported by one or more of said one or more frame structures;
   (e) wherein said suspension system comprises one or more wheels that are disposed near said engine of said vehicle;
   (f) panel-support components that are engaged directly or indirectly to one or more of said one or more frame structures of said vehicle;
   (g) an engine compartment splash panel;

(h) wherein said engine compartment splash panel and said panel-support components comprise panel mounting structure which comprises two or more complimentary pairs of panel-locating features;

(i) wherein each of said two or more complimentary pairs of panel-locating features comprises a locating feature that is mounted to and/or defined by said engine compartment splash panel and a complimentary locating feature that is mounted to and/or defined by said panel-support components;

(j) wherein said engine compartment splash panel comprises a substantially rigid portion that constitutes a majority of said engine compartment splash panel;

(k) wherein a majority of said two or more locating features that are mounted to and/or defined by said engine compartment splash panel are rigidly mounted to or defined by said substantially rigid portion of said engine compartment splash panel and therefore have fixed positions and orientations relative to one another;

(l) wherein said panel-support components and said locating features that are mounted to and/or defined by said panel-support components are constructed and engaged to one another in such a manner that any locating features that are mounted to or defined by said panel-support components have fixed positions and orientations relative to one another;

(m) wherein said locating features that are mounted to and/or defined by said engine compartment splash panel and said locating features that are mounted to and/or defined by said panel-support components and that are complimentary to said locating features that are mounted to and/or defined by said engine compartment splash panel are engaged to one another in such a manner that said engine compartment splash panel is rigidly mounted to said vehicle in an in-service position substantially between one of said wheels of said vehicle that is disposed near said engine and said engine of said vehicle;

(n) said two or more complimentary pairs of panel-locating features of said panel-mounting structure include one or more complimentary pairs of a spring clip and a clip engagement structure that are engaged to one another;

(o) a spring clip of each of said one or more complimentary pairs of a spring clip and a clip engagement structure is mounted to or defined by either said engine compartment splash panel or said panel-support components; and (p) a clip engagement structure of each of said one or more complimentary pairs of a spring clip and a clip engagement structure is mounted to or defined by whichever of said engine compartment splash panel and said panel-support components said spring clip to which it is engaged is not mounted to or defined by.

2. The vehicle of claim 1, wherein:

(a) said two or more complimentary pairs of panel-locating features of said panel-mounting structure comprise one or more complimentary pairs of slide-to-engage panel-locating features;

(b) each of said one or more complimentary pairs of slide-to-engage panel-locating features comprises a male panel-locating feature and a complimentary female panel-locating feature;

(c) said male panel-locating feature of each complimentary pair of slide-to-engage panel-locating features is mounted to or defined by either said engine compartment splash panel or said panel-support components;

(d) said female panel-locating feature of each complimentary pair of slide-to-engage panel-locating features is mounted to or defined by whichever of said engine compartment splash panel and said panel-support components its complimentary male panel-locating feature is not mounted to or defined by;

(e) all male panel-locating features and/or female panel-locating features and all spring clips and/or clip engagement structures that are mounted to and/or defined by said engine compartment splash panel have substantially fixed positions and orientations relative to one another; and (f) all male panel-locating features and/or female panel-locating features and all spring clips and/or clip engagement structures that are mounted to and/or defined by said panel-support components have fixed positions relative to one another.

3. The vehicle of claim 2, wherein:

(a) each spring clip and clip engagement structure of said one or more complimentary pairs of a spring clip and a clip engagement structure are constructed and oriented in such a manner and each male panel-locating feature and female panel locating feature of each of said one or more complimentary pairs of slide-to-engage panel-locating features are constructed and oriented in such a manner that all of said one or more complimentary pairs of a spring clip and a clip engagement structure and all of said one or more complimentary pairs of slide-to-engage panel-locating features have at least one common engagement direction.

4. The vehicle of claim 3, wherein:

(a) all of said spring clips of said panel-mounting structure are self-camming in engagement;

(b) each of said spring clips of said panel-mounting structure that is self-camming in engagement comprises one or more leaf springs that define outer camming surfaces adjacent to an outermost retention projection of said leaf springs; and (c) each of said outer camming surfaces, that is defined adjacent an outermost retention projection of a leaf spring of a spring clip that is self-camming in engagement, slopes in a direction opposite which said adjacent outermost retention projection projects from said leaf spring as said camming surface extends away from said outermost retention projection toward an outer end of said leaf spring.

5. The vehicle of claim 4, wherein:

(a) leaf springs of any spring clips that are mounted to and/or defined by said substantially rigid portion of said engine compartment splash panel and any male panel-locating features that are mounted to and/or defined by said substantially rigid portion of said engine compartment splash panel all extend parallel to one another and in a same direction from their respective points of engagement to said engine compartment splash panel;

(b) leaf springs of any spring clips that are mounted to and/or defined by said panel-support components and any male panel-locating features that are mounted to and/or defined by said panel-support components all extend parallel to one another and in a same direction from their respective points of engagement to said panel-support components; and (c) said leaf springs of any spring clips that are mounted to and/or defined by said substantially rigid portion of said engine compartment splash panel and any male panel-locating features that are mounted to and/or defined by said substantially rigid portion of said engine compartment splash panel extend from their respective points of engagement to said engine compartment splash panel in a direction which is substantially opposite a direction in which leaf springs of any spring clips that are mounted to and/or defined by said panel-support components and any male panel-locating features mounted to and/or defined by said panel-support components extend from their respective points of engagement to said panel-support components.

6. The vehicle of claim 5, wherein:
(a) said panel-mounting structure includes two or less complimentary pairs of a spring clip and a clip engagement structure;
(b) each of two or less spring clips of said two or less complimentary pairs of a spring clip and a clip engagement structure is mounted to and/or defined by said substantially rigid portion of said engine compartment splash panel;
(c) each of two or less clip engagement structures of said two or less complimentary pairs of a spring clip and a clip engagement structure is mounted to and/or defined by said panel-support components;
(d) each of said two or less spring clips of said panel-mounting structure comprises a leaf spring;
(e) each said leaf spring of each of said two or less spring clips extends substantially parallel to a complimentary clip-opposing surface defined by said engine compartment splash panel and, if two spring clips are present, a leaf spring of one of said spring clips extends substantially parallel to a leaf spring of the other of said spring clips and said leaf spring of said one of said spring clips extends in a same direction from its respective point of engagement to said engine compartment splash panel as said leaf spring of said other of said spring clips extends from its respective point of engagement to said engine compartment splash panel;
(f) one or more of said one or more complimentary pairs of slide-to-engage panel-locating features comprise a tab mounted to or defined by said substantially rigid portion of sad engine compartment splash panel or said panel-support components and a complimentary panel-locating channel structure mounted to or defined by whichever of said engine compartment splash panel and said panel-support components its complimentary tab is not mounted to or defined by;
(g) each complimentary pair of a tab and a panel-locating channel structure are engaged to one another with said tab disposed within a panel-locating channel slot defined by said panel-locating channel structure; and
(h) any panel-locating channel structures mounted to or defined by said engine compartment splash panel are oriented in such a manner that their channel side walls extend parallel to said leaf springs and in a same direction from a respective base wall of said panel-locating channel structure as said leaf springs extend from their respective points of engagement to said engine compartment splash panel; and
(i) any panel-locating channel structures mounted to or defined by said panel-support components are oriented in such a manner that their channel side walls extend parallel to said leaf springs and in an opposite direction from a respective base wall of said panel-locating channel structure as said leaf springs extend from their respective points of engagement to said engine compartment splash panel.

7. The vehicle of claim 6, wherein:
(a) each of said clip engagement structures is disposed between said leaf spring of one of said spring clips and said complimentary clip-opposing surface of said engine compartment splash panel in such a manner that substantial relative movement between a portion of said engine compartment splash panel to which said spring clips are engaged and said panel-support components is prevented in directions perpendicular to said complimentary clip-opposing surface of said engine compartment splash panel;
(b) each of said clip engagement structures defines a retention recess that extends into or through said clip engagement structure in a direction perpendicular to a direction in which said clip engagement structure extends
(c) said direction in which each of said retention recesses extends into or through a respective clip engagement structure is also perpendicular to respective clip-opposing surfaces between which and a respective leaf spring said respective clip engagement structure is disposed;
(d) each said leaf spring of each of said spring clips defines a retention projection that extends from said leaf spring in directions perpendicular to said complimentary clip-opposing surfaces into a retention recess defined by a respective clip engagement structure and each of said retention projections is bounded in directions parallel to said complimentary clip-opposing surfaces between portions of said respective clip engagement structure that are disposed upon opposite sides of said retention recess into which said retention projection protrudes.

8. The vehicle of claim 7, wherein:
(a) said clip-opposing surfaces defined by said engine compartment splash panel are oriented substantially vertically;
(b) each said leaf spring of each of said spring clips of said panel-mounting structure extends substantially vertically downwardly from its respective point of engagement to said engine compartment splash panel toward its outer end; and
(c) each of said panel-locating channel structures of said panel-mounting structure is oriented in such a manner that said side walls of each of said panel-locating channel structures extend substantially vertically upwardly or vertically downwardly from a respective base wall of a respective panel-locating channel structure.

9. The vehicle of claim 8, wherein:
(a) said panel-locating channel structures of said one or more complimentary pairs of slide-to-engage panel-locating features comprise two panel-locating channel structures that are mounted to and/or defined by said panel-support components;
(b) said two panel-locating channel structures that are mounted to and/or defined by said panel-support components are oriented such that their channel side walls extend vertically upwardly from their channel base walls;
(c) each of two of said complimentary pairs of slide-to-engage panel-locating channel structures comprises a tab that is defined by a portion of said substantially rigid portion of said engine compartment splash panel adjacent a tower edge of said substantially rigid portion of said engine compartment splash panel; and (d) each said tab defined adjacent said lower edge of said substantially rigid portion of said engine compartment splash panel is disposed within a panel-locating slot defined by one of said two panel-locating channel structures mounted to or defined by said panel-support components.

10. The vehicle of claim 9, wherein:

(a) each said leaf spring of each of said spring clips of said panel-mounting structure is integral to and is defined by said engine compartment splash panel.

11. The vehicle of claim 10, wherein:

(b) said panel-support components comprise two panel-mounting members that extend vertically upwardly from their respective points of engagement to said vehicle;

(c) one of said two or less clip engagement structures of said panel-mounting structure is defined by an upper end of each of said two panel-mounting members; and (d) one of said two panel-locating channel structures that are mounted to said panel-support components is mounted to each of said panel-mounting members adjacent a lower end of said panel-mounting member.

12. The vehicle of claim 11, wherein:

(a) said one or more frame structures of said vehicle comprise a frame structure that extends substantially along an entire length of said vehicle;

(b) said engine of said vehicle is mounted to a front portion of said frame structure that extends substantially along an entire length of said vehicle;

(c) said one or more wheels of said suspension system that are disposed near said engine of said vehicle comprise two front wheels of said vehicle;

(d) each of said front wheels of said vehicle is disposed adjacent said front portion of said frame structure of said vehicle that extends along substantially an entire length of said vehicle;

(e) said front wheels of said vehicle are disposed upon sides of said front portion of said frame structure laterally opposite one another;

(f) said engine compartment splash panel is disposed generally between one of said two front wheels of said vehicle and said engine of said vehicle;

(g) said vehicle comprises an engine compartment hood that is disposed above said engine and covers an area surrounding said engine when said engine compartment hood is disposed in a closed position;

(h) said vehicle comprises two front fender panels each of which surrounds one of said front wheels of said vehicle in certain directions when said front fender panel is in an in-service position;

(i) each of said front fender panels is rigidly mounted to said engine compartment hood in such a position that when said engine compartment hood is disposed in its closed position each of said front fender panels is disposed in its in-service position;

(j) said engine compartment hood can be pivoted to an open position or removed from said vehicle to allow access to said engine of said vehicle; and (k) when said engine compartment hood is either pivoted to an open position or removed from said vehicle, both of said front fender panels move with the engine compartment hood away from their in-service position.

13. The vehicle of claim 1, wherein:

(a) any of said spring clips of said panel-mounting structure that are mounted to and/or defined by said substantially rigid portion of said engine compartment splash panel are self-camming in engagement;

(b) any of said spring clips of said panel-mounting structure that are mounted to and/or defined by said panel-support components and that are complimentary to and engaged to clip engagement structures that are mounted to and/or defined by said substantially rigid portion of said engine compartment splash panel are self-camming in engagement;

(c) each of said spring clips of said panel-mounting structure that is self-camming in engagement comprises one or more leaf springs that define outer camming surfaces adjacent to an outermost retention projection of said leaf springs; and (d) each of said outer camming surfaces, that is defined adjacent an outermost retention projection of a leaf spring of a spring clip that is self-camming in engagement, slopes in a direction opposite which said adjacent outermost retention projection projects from said leaf spring as said camming surface extends away from said outermost retention projection toward an outer end of said leaf spring.

14. The vehicle of claim 13, wherein:

(a) each spring clip and clip engagement structure of said one or more complimentary pairs of a spring clip and a clip engagement structure are constructed and oriented in such a manner that all of said one or more complimentary pairs of a spring clip and a clip engagement structure have at least one common engagement direction.

15. The vehicle of claim 14, wherein:

(a) leaf springs of any spring clips that are mounted to and/or defined by said substantially rigid portion of said engine compartment splash panel all extend parallel to one another and in a same direction from their respective points of engagement to said engine compartment splash panel;

(b) leaf springs of any spring clips that are mounted to and/or defined by said panel-support components all extend parallel to one another and in a same direction from their respective points of engagement to said panel-support components; and (c) said leaf springs of any spring clips that are mounted to and/or defined by said substantially rigid portion of said engine compartment splash panel extend from their respective points of engagement to said engine compartment splash panel in a direction which is substantially opposite a direction in which leaf springs of any spring clips that are mounted to and/or defined by said panel-support components extend from their respective points of engagement to said panel-support components.

16. The vehicle of claim 15, wherein:

(a) one or more of said spring clips of said panel-mounting structure comprise a leaf spring that extends substantially parallel to complimentary clip-opposing surfaces defined by whichever of said engine compartment splash panel and said panel-support components said leaf spring is mounted to or defined by;

(b) between each of said one or more leaf springs that extend substantially parallel to said complimentary clip-opposing surfaces and said complimentary clip-opposing surfaces is disposed a clip engagement structure that is mounted to or defined by whichever of said engine compartment splash panel and said panel-support components said leaf spring is not mounted to or defined by and, thus, substantial relative movement between said engine compartment splash panel and said panel-support components is prevented in directions perpendicular to said complimentary clip-opposing surfaces;

(c) each of said clip engagement structures that is disposed substantially between one of said leaf springs and said complimentary clip-opposing surfaces defines a retention recess that extends into or through said clip engagement structure in a direction perpendicular to a direction in which said clip engagement structure extends;

(d) said direction in which each respective retention recess extends into or through a respective clip engagement structure that defines it is also perpendicular to respective complimentary clip-opposing surfaces between which and a respective leaf spring said respective clip engagement structure is disposed;

(e) each of said leaf springs of said spring clips that extend parallel to said complimentary clip-opposing surfaces defines a retention projection that extends from said leaf spring in directions perpendicular to and toward said clip-opposing surfaces into a retention recess defined by a respective clip engagement structure that is disposed between said leaf spring and said complimentary clip opposing surfaces; and (f) each of said retention projections is bounded, in directions parallel to respective clip-opposing surfaces that are parallel to a leaf spring that defines said retention projection, between portions of said respective clip engagement structure that are disposed upon opposite sides of said retention recess into which said retention projection protrudes.

17. The vehicle of claim 16, wherein:

(a) said clip-opposing surfaces defined by said engine compartment splash panel and/or said panel-support components are oriented substantially vertically;

(b) any leaf springs of said panel-mounting structure that are mounted to and/or defined by said engine compartment splash panel extend substantially vertically downwardly from respective points at which they are engaged to said engine compartment splash panel toward their outer ends; and (c) any leaf springs of said panel-mounting structure that are mounted to and/or defined by said panel-support components extend substantially vertically upwardly from respective points at which they are engaged to said engine compartment splash panel toward their outer ends.

18. The vehicle of claim 17, wherein:

(a) said panel-support components comprise two panel-mounting members that extend vertically upwardly from their respective points of engagement to said vehicle; and (b) one of said clip engagement structures of said panel-mounting structure is defined by an upper end of each of said panel-mounting members.

19. The vehicle of claim 18, wherein:

(a) said one or more frame structures of said vehicle include a frame structure that extends substantially along an entire length of said vehicle;

(b) said engine of said vehicle is mounted to a front portion of said frame structure that extends substantially along an entire length of said vehicle;

(c) said one or more wheels of said suspension system that are disposed near said engine of said vehicle comprise two front wheels of said vehicle that are disposed adjacent said front portion of said frame structure of said vehicle;

(d) said front wheels of said vehicle are disposed upon laterally opposite sides of said front portion of said frame structure relative to one another;

(e) said engine compartment splash panel is disposed generally between one of said two front wheels of said vehicle and said engine of said vehicle;

(f) said vehicle comprises an engine compartment hood that is disposed above said engine and covers an area surrounding said engine when said engine compartment hood is disposed in a closed position;

(g) said vehicle comprises two front fender panels each of which surrounds one of said front wheels of said vehicle in certain directions when said front fender panel is in an in-service position;

(h) each of said front fender panels is rigidly mounted to said engine compartment hood in such a position that, when said engine compartment hood is disposed in its closed position, both of said front fender panels is disposed in its in-service position;

(i) said engine compartment hood can be pivoted to an open position or removed from said vehicle to allow access to said engine of said vehicle; and (j) when said engine compartment hood is pivot to an open position or removed from said vehicle, both of said front fender panels move with said engine compartment hood away from their in-service position.

20. The vehicle of claim 3, wherein:

(a) leaf springs of any spring clips that are mounted to and/or defined by said substantially rigid portion of said engine compartment splash panel and any male panel-locating features that are mounted to and/or defined by said substantially rigid portion of said engine compartment splash panel all extend parallel to one another and in a same direction from their respective points of engagement to said engine compartment splash panel;

(b) leaf springs of any spring clips that are mounted to and/or defined by said panel-support components and any male panel-locating features that are mounted to and/or defined by said panel-support components all extend parallel to one another and in a same direction from their respective points of engagement to said panel-support components; and (c) said leaf springs of any spring clips that are mounted to and/or defined by said substantially rigid portion of said engine compartment splash panel and any male panel-locating features that are mounted to and/or defined by said substantially rigid portion of said engine compartment splash panel extend from their respective points of engagement to said engine compartment splash panel in a direction which is substantially opposite a direction in which leaf springs of any spring clips that are mounted to and/or defined by said panel-support components and any male panel-locating features mounted to and/or defined by said panel-support components extend from their respective points of engagement to said panel-support components.

21. The vehicle of claim 20, wherein:
(a) said panel-mounting structure includes two or less complimentary pairs of a spring clip and a clip engagement structure;
(b) each of two or less spring clips of said two or less complimentary pairs of a spring clip and a clip engagement structure is mounted to or defined by said substantially rigid portion of said engine compartment splash panel;
(c) each of two or less clip engagement structures of said two or less complimentary pairs of a spring clip and a clip engagement structure is mounted to and or defined by said panel-support components;
(d) each of said two or less spring clips of said panel mounting structure comprises a leaf spring;
(e) each said leaf spring of each of said two or less spring clips extends substantially parallel to a complimentary clip-opposing surface defined by said engine compartment splash panel and, if two spring clips are present, a leaf spring of one of said spring clips extends substantially parallel to a leaf spring of the other of said spring clips and said leaf spring of said one of said spring clips extends in a same direction from its respective point of engagement to said engine compartment splash panel as said leaf spring of said other of said spring clips extends from its respective point of engagement to said engine compartment splash panel;
(f) said two or more complimentary pairs of panel-locating features of said panel-mounting structure comprise one or more complimentary pairs of slide-to-engage panel-locating features that comprise a tab mounted to or defined by either said engine compartment splash panel or said panel-support components and a complimentary panel-locating channel structure mounted to or defined by whichever of said engine compartment splash panel and said panel-support components its complimentary tab is not mounted to or defined by;
(g) each complimentary pair of a tab and a panel-locating channel structure are engaged to one another with said tab disposed within a panel-locating slot defined by said panel-locating channel structure;
(h) any panel-locating channel structures mounted to or defined by said engine compartment splash panel are oriented in such a manner that their channel side walls extend parallel to said leaf springs and in a same direction from a respective base wall of said panel-locating channel structure as said leaf springs extend from their respective points of engagement to said engine compartment splash panel; and
(i) any panel-locating channel structures mounted to or defined by said panel-support components are oriented in such a manner that their channel side walls extend parallel to said leaf springs and in an opposite direction from a respective base wall of said panel-locating channel structure as said leaf springs extend from their respective points of engagement to said engine compartment splash panel.

22. The vehicle of claim 21, wherein:
(a) each of said clip engagement structures is disposed between said leaf spring of one of said spring clips and said complimentary clip-opposing surface of said engine compartment splash panel in such a manner that substantial relative movement between a portion of said engine compartment splash panel to which said spring clips are engaged and said panel support components is prevented in directions perpendicular to said complimentary clip-opposing surface of said engine compartment splash panel;
(b) each of said clip engagement structures defines a retention recess that extends into or through said clip engagement structure in a direction perpendicular to a direction in which said clip engagement structure extends
(c) said direction in which each respective retention recess extends into or through a respective clip engagement structure that defines it is also perpendicular to respective clip-opposing surfaces between which and a respective leaf spring said respective clip engagement structure that defines said respective retention recess;
(d) each said leaf spring of each of said spring clips defines a retention projection that extends in directions perpendicular to said complimentary clip-opposing surfaces into a retention recess defined by a respective clip engagement structure that is disposed between said leaf spring and said complimentary clip-opposing surfaces;
(e) each of said retention projections is bounded, in directions parallel to said complimentary clip-opposing surfaces between which and said leaf spring that defines said retention projection a respective clip engagement structure is disposed, between portions of said respective clip engagement structure that are disposed upon opposite sides of said retention recess into which said retention projection protrudes.

23. The vehicle of claim 22, wherein:
(a) said clip-opposing surfaces defined by said engine compartment splash panel are oriented substantially vertically;
(b) each said leaf spring of each of said spring clips of said panel-mounting structure extends substantially vertically downwardly from its respective point of engagement to said engine compartment splash panel toward its outer ends; and
(c) each of said panel-locating channel structures of said panel-mounting structure is oriented in such a manner that said side walls of each of said panel-locating channel structures extend substantially vertically upwardly or vertically downwardly from a respective base wall of each of said panel-locating channel structures.

24. The vehicle of claim 22, wherein:
(a) said panel-locating channel structures of said one or more complimentary pairs of slide-to-engage panel-locating features comprise two panel-locating channel structures that are mounted to and/or defined by said panel-support components;
(b) said two panel-locating channel structures that are mounted to and/or defined by said panel-support components are oriented such that their channel side walls extend vertically upwardly from their channel base walls;
(c) each of two of said complimentary pairs of slide-to-engage panel-locating channel structures comprises a tab that is defined by a portion of said substantially rigid portion of said engine compartment splash panel adjacent a lower edge of said substantially rigid portion of said engine compartment splash panel; and
(d) each said tab defined adjacent said lower edge of said substantially rigid portion of said engine compartment splash panel is disposed within a panel-locating slot defined by one of said two panel-locating channel structures that is mounted to or defined by said panel-support components.

25. The vehicle of claim 24, wherein:
(a) said panel-support components comprise two panel-mounting members that extend vertically upwardly from their respective points of engagement to said vehicle;
(b) one of said two or less clip engagement structures of said panel-mounting structure is defined by an upper end of each of said panel-mounting members; and
(c) one of said two panel-locating channel structures that are mounted to said panel-support components is mounted to each of said panel-mounting members adjacent a lower end of each of said panel-mounting members.

26. The vehicle of claim 25, wherein:
(a) said one or more frame structures of said vehicle include a frame structure that extends substantially along an entire length of said vehicle;
(b) said engine of said vehicle is mounted to a front portion of said frame structure that extends substantially along an entire length of said vehicle;
(c) said one or more wheels of said suspension system that are disposed near said engine of said vehicle comprise two front wheels of said vehicle that are disposed adjacent said front portion of said frame structure;
(d) said two front wheels are disposed upon laterally opposite sides of said front portion of said frame structure relative to one another;
(e) said engine compartment splash panel is disposed generally between one of said two front wheels of said vehicle and said engine of said vehicle;
(f) said vehicle comprises an engine compartment hood that is disposed above said engine and covers an area surrounding said engine when said engine compartment hood is disposed in a closed position;
(g) said vehicle comprises two front fender panels each of which surrounds one of said front wheels of said vehicle in certain directions when said front fender panel is in an in-service position;
(h) each of said front fender panels is rigidly mounted to said engine compartment hood in such a position that, when said engine compartment hood is disposed in said closed position, each of said front fender panels is disposed in an in-service position;
(i) said engine compartment hood can be pivoted to an open position or removed from said vehicle to allow access to said engine of said vehicle; and
(j) when said engine compartment hood is pivoted to an open position or removed from said vehicle, both of said front fender panels move with said engine compartment hood away from their in-service position.

27. The vehicle of claim 1, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retentions projections; and
(c) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

28. The vehicle of claim 2, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retention projections; and
(c) each said self-retaining complimentary pair of a spring clip and a clip engagement structure is constructed in such a manner that at least one of its one or more retention projections and at least one portion of its engagement structure are disposed in one anothers paths in a disengagement direction of said self-retaining complimentary pair of a spring clip and a clip engagement structure.

29. The vehicle of claim 3, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retentions projections; and
(c) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

30. The vehicle of claim 4, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retentions projections; and
(c) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

31. The vehicle of claim 5, wherein:
(d) one or more of said complimentary pairs of a spring clip and clip engagement structure is a self-retaining complimentary pair of a spring clip and a clip engagement structure;
(e) each said self-retaining complimentary pair of a spring clip and a clip engagement structure comprises a spring clip with a leaf spring that has one or more retentions projections; and
(f) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

32. The vehicle of claim 13, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retentions projections; and
(c) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

33. The vehicle of claim 14, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retentions projections; and
(c) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

34. The vehicle of claim 15, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retentions projections; and
(c) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

35. The vehicle of claim 16, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retentions projections; and
(c) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

36. The vehicle of claim 20, wherein:
(a) one or more of said complimentary pairs of a spring clip and clip engagement structure is a self-retaining complimentary pair of a spring clip and a clip engagement structure;
(b) each said self-retaining complimentary pair of a spring clip and a clip engagement structure comprises a spring clip with a leaf spring that has one or more retentions projections; and
(c) each said self-retaining complimentary pair of a spring clip and a clip engagement structure is constructed in such a manner that at least one of its one or more retention projections and at least one portion of its engagement structure are disposed in one another's paths in a disengagement direction of said self-retaining complimentary pair of a spring clip and a clip engagement structure.

37. The vehicle of claim 1, wherein:
(d) said panel-support components comprise two panel-mounting members that extend vertically upwardly from their respective points of engagement to said vehicle; and
(e) one or more of said clip engagement structures of said panel-mounting structure is defined by or fixedly mounted to each of said two panel-mounting members.

38. The vehicle of claim 2, wherein:
(a) said panel-support components comprise two panel-mounting members that extend vertically upwardly from their respective points of engagement to said vehicle; and
(b) one or more of said clip engagement structures of said panel-mounting structure is defined by or fixedly mounted to each of said two panel-mounting members.

39. The vehicle of claim 3, wherein:
(a) said panel-support components comprise two panel-mounting members that extend vertically upwardly from their respective points of engagement to said vehicle; and
(b) one or more of said clip engagement structures of said panel-mounting structure is defined by or fixedly mounted to each of said two panel-mounting members.

40. The vehicle of claim 4, wherein:
(a) said panel-support components comprise two panel-mounting members that extend vertically upwardly from their respective points of engagement to said vehicle; and
(b) one or more of said clip engagement structures of said panel-mounting structure is defined by or fixedly mounted to each of said two panel-mounting members.

41. The vehicle of claim 5, wherein:
(a) said panel-support components comprise two panel-mounting members that extend vertically upwardly from their respective points of engagement to said vehicle; and
(b) one or more of said clip engagement structures of said panel-mounting structure is defined by or fixedly mounted to each of said two panel-mounting members.

42. The vehicle of claim 13, wherein:

(a) said panel-support components comprise two panel-mounting members that extend vertically upwardly from their respective points of engagement to said vehicle; and (b) one or more of said clip engagement structures of said panel-mounting structure is defined by or fixedly mounted to each of said two panel-mounting members.

43. The vehicle of claim 14, wherein:

(a) said panel-support components comprise two panel-mounting members that extend vertically upwardly from their respective points of engagement to said vehicle; and (b) one or more of said clip engagement structures of said panel-mounting structure is defined by or fixedly mounted to each of said two panel-mounting members.

44. The vehicle of claim 13, wherein:

(a) said panel-support components comprise two panel-mounting members that extend vertically upwardly from their respective points of engagement to said vehicle; and (b) one or more of said clip engagement structures of said panel-mounting structure is defined by or fixedly mounted to each of said two panel-mounting members.

45. The vehicle of claim 16, wherein:

(a) said panel-support components comprise two panel-mounting members that extend vertically upwardly from their respective points of engagement to said vehicle; and (b) one or more of said clip engagement structures of said panel-mounting structure is defined by or fixedly mounted to each of said two panel-mounting members.

46. The vehicle of claim 20, wherein:

(a) said panel-support components comprise two panel-mounting members that extend vertically upwardly from their respective points of engagement to said vehicle; and (b) one or more of said clip engagement structures of said panel-mounting structure is defined by or fixedly mounted to each of said two panel-mounting members.

* * * * *